(12) United States Patent
Tamoto et al.

(10) Patent No.: US 9,272,700 B2
(45) Date of Patent: Mar. 1, 2016

(54) CONTROL SYSTEM FOR FOUR-WHEEL DRIVE VEHICLE

(71) Applicant: Toyota Jidosha Kabushiki Kaisha, Toyota-shi Aichi-ken (JP)

(72) Inventors: Hideki Tamoto, Toyota (JP); Masayuki Arai, Toyota (JP); Yoshiro Obayashi, Toyota (JP); Kunihiro Iwatsuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/540,633

(22) Filed: Nov. 13, 2014

(65) Prior Publication Data

US 2015/0142280 A1 May 21, 2015

(30) Foreign Application Priority Data

Nov. 19, 2013 (JP) ................................. 2013-239372

(51) Int. Cl.
*B60W 10/119* (2012.01)
*B60W 10/10* (2012.01)

(52) U.S. Cl.
CPC ............. *B60W 10/119* (2013.01); *B60W 10/10* (2013.01)

(58) Field of Classification Search
None
See application file for complete search history.

(56) References Cited

U.S. PATENT DOCUMENTS

| 8,204,657 | B2 | 6/2012 | Buszek et al. | |
| 2004/0044458 | A1* | 3/2004 | Kadota | B60K 6/44 701/55 |

FOREIGN PATENT DOCUMENTS

JP 64-016432 A 1/1989

* cited by examiner

*Primary Examiner* — Erin D Bishop
(74) *Attorney, Agent, or Firm* — Dinsmore & Shohl LLP

(57) ABSTRACT

A disconnect mechanism is configured to disconnect a predetermined rotating element from an engine and an auxiliary drive wheels while the vehicle is traveling in a two-wheel drive mode. The predetermined rotating element is configured to transmit power to the auxiliary drive wheels while the vehicle is traveling in a four-wheel drive mode. An electronic control unit is configured to: execute shift control when a shift condition of an automatic transmission is satisfied; selectively engage or release the disconnect mechanism based on a traveling state of the vehicle and a driver's predetermined operation; and control at least one of the automatic transmission or the disconnect mechanism such that a shift period based on the shift condition of the automatic transmission and an engagement-release period of the disconnect mechanism at least partially overlap with each other.

12 Claims, 8 Drawing Sheets

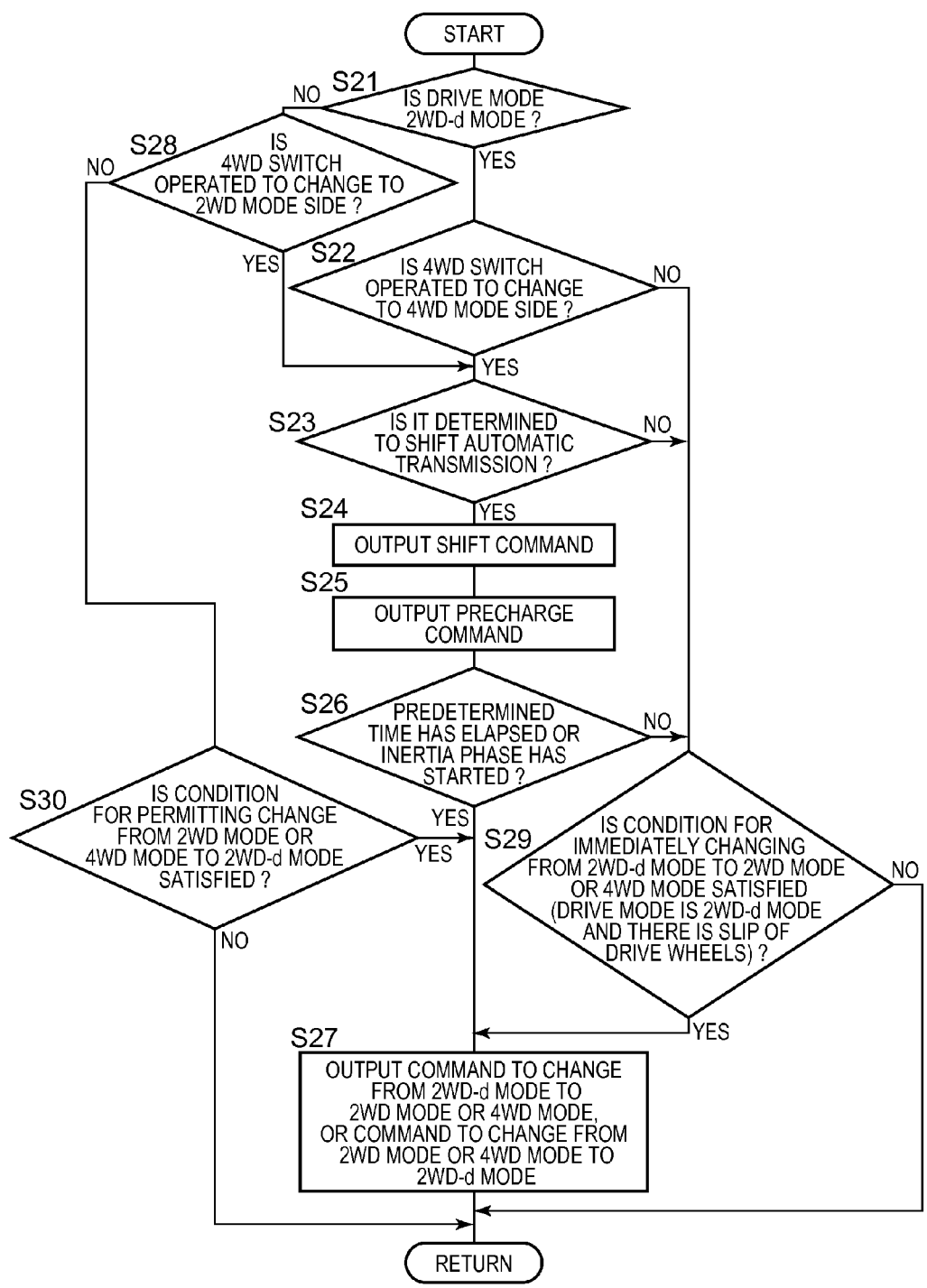

CONTROL SYSTEM FOR FOUR-WHEEL DRIVE VEHICLE

INCORPORATION BY REFERENCE

The disclosure of Japanese Patent Application No. 2013-239372 filed on Nov. 19, 2013 including the specification, drawings and abstract is incorporated herein by reference in its entirety.

BACKGROUND OF THE INVENTION

1. Field of the Invention

The invention relates to a four-wheel drive vehicle and, more particularly, to a control system for a four-wheel drive vehicle including an automatic transmission and a disconnect mechanism, the automatic transmission being provided in a power transmission path between an engine and both main drive wheels and auxiliary drive wheels, the disconnect mechanism being provided in a power transmission path between the automatic transmission and the auxiliary drive wheels and configured to selectively connect or interrupt the power transmission path.

2. Description of Related Art

There has been suggested a four-wheel drive vehicle including an engine, main drive wheels, auxiliary drive wheels, an automatic transmission and a disconnect mechanism. Power is transmitted from the engine to the main drive wheels while the vehicle is traveling in a two-wheel drive mode or in a four-wheel drive mode. Power is transmitted from the engine to the auxiliary drive wheels while the vehicle is traveling in the four-wheel drive mode. The automatic transmission is provided in a power transmission path between the engine and both the main drive wheels and the auxiliary drive wheels. The disconnect mechanism is provided in a power transmission path between the automatic transmission and the auxiliary drive wheels, and disconnects a predetermined rotating element from the engine and the auxiliary drive wheels while the vehicle is traveling in the two-wheel drive mode. The predetermined rotating element is used to transmit power to the auxiliary drive wheels while the vehicle is traveling in the four-wheel drive mode. In the thus configured four-wheel drive vehicle, the disconnect mechanism is released to interrupt transmission of power from the engine and the auxiliary drive wheels to the predetermined rotating element while the vehicle is traveling in the two-wheel drive mode. Thus, co-rotation of the predetermined rotating element is suppressed while the vehicle is traveling in the two-wheel drive mode, so running resistance decreases, and fuel efficiency improves.

SUMMARY OF THE INVENTION

When the disconnect mechanism is engaged or released at arbitrary timing not intended by a driver, the driver experiences a feeling of strangeness because of, for example, a change in rotational inertia while the disconnect mechanism is being engaged or released. In contrast, Japanese Patent Application Publication No. 64-16432 (JP 64-16432 A) describes a technique for, in a four-wheel drive vehicle equipped with an automatic transmission, smoothing a change between a two-wheel drive mode and a four-wheel drive mode by temporarily changing the automatic transmission to neutral or high gear in a transitional period of the change between the two-wheel drive mode and the four-wheel drive mode.

However, when the technique described in JP 64-16432 A is applied to the four-wheel drive vehicle including the disconnect mechanism, the automatic transmission is temporarily changed to neutral or high gear while the disconnect mechanism is being engaged or released. As a result, a driver experiences a feeling of strangeness. Particularly, when the automatic transmission is controlled to neutral, a change in driving force is large. Thus, a feeling of strangeness experienced by the driver also increases. When the automatic transmission is changed to high gear as well, the automatic transmission needs to be changed to an ordinary speed stage after a change of the disconnect mechanism, so the automatic transmission is further shifted, with the result that the driver experiences a feeling of strangeness.

The invention provides a control system for a four-wheel drive vehicle including an automatic transmission and a disconnect mechanism, which suppresses a feeling of strangeness experienced by a driver while the disconnect mechanism is being engaged or released.

A first aspect of the invention provides a control system for a four-wheel drive vehicle. The four-wheel drive vehicle includes an engine, main drive wheels to which power is transmitted from the engine while the vehicle is traveling in a two-wheel drive mode or in a four-wheel drive mode, auxiliary drive wheels to which power is transmitted from the engine while the vehicle is traveling in the four-wheel drive mode, an automatic transmission provided in a power transmission path between the engine and the main drive wheels and a power transmission path between the engine and the auxiliary drive wheels, and a disconnect mechanism provided in a power transmission path between the automatic transmission and the auxiliary drive wheels. The disconnect mechanism is configured to disconnect a predetermined rotating element from the engine and the auxiliary drive wheels while the vehicle is traveling in the two-wheel drive mode. The predetermined rotating element is configured to transmit power to the auxiliary drive wheels while the vehicle is traveling in the four-wheel drive mode. The control system includes an electronic control unit. The electronic control unit is configured to: (a) execute shift control when a shift condition of the automatic transmission is satisfied; (b) selectively engage or release the disconnect mechanism on the basis of a traveling state of the vehicle and a driver's predetermined operation; and (c) control at least one of the automatic transmission or the disconnect mechanism such that a shift period based on the shift condition of the automatic transmission and an engagement-release period of the disconnect mechanism at least partially overlap with each other.

According to the above aspect, because the shift period based on the shift condition of the automatic transmission and the engagement-release period of the disconnect mechanism at least partially overlap with each other, the disconnect mechanism is at least partially engaged or released during a shift of the automatic transmission, so it is possible to suppress a feeling of strangeness experienced by the driver in the case where the disconnect mechanism is engaged or released separately. That is, by controlling at least one of the automatic transmission or the disconnect mechanism such that a shift of the automatic transmission and engagement or release of the disconnect mechanism overlap with each other, it is possible to cause a feeling of strangeness experienced by the driver due to a change in rotational inertia during engagement or release of the disconnect mechanism to disappear in a change in driving force resulting from a shift of the automatic transmission. Thus, it is possible to suppress a feeling of strangeness experienced by the driver in the case where the disconnect mechanism is engaged or released separately. Because a shift of the automatic transmission is based on the shift condition of the automatic transmission, the automatic transmission is not shifted for the purpose of engaging or releasing the disconnect mechanism, so a feeling of strangeness experienced by the driver resulting from an unnecessary shift is also prevented.

In the above aspect, the shift condition may be one of a preset automatic shift condition that is prescribed based on a traveling state of the vehicle and a driver's operation related to a shift. According to the above aspect, the automatic transmission is shifted when the shift condition is satisfied, and the disconnect mechanism is engaged or released in a period that partially overlaps with the shift period. Thus, it is possible to suppress a feeling of strangeness due to, for example, a change in rotational inertia during engagement or release of the disconnect mechanism.

In the above aspect, the driver's operation related to a shift may be in common with a predetermined operation related to engagement or release of the disconnect mechanism. Because the driver's operation related to a shift is in common with the predetermined operation related to engagement or release of the disconnect mechanism, the operation related to engagement or release of the disconnect mechanism is also carried out when the operation related to a shift is carried out. When a shift of the automatic transmission and engagement or release of the disconnect mechanism are carried out on the basis of the common operation, by causing the shift period of the automatic transmission and the engagement-release period of the disconnect mechanism to overlap with each other, it is possible to suppress a feeling of strangeness experienced by the driver in the case where the disconnect mechanism is engaged or released separately.

In the above aspect, the driver's operation related to a shift may include at least one of a change operation into a sequential shift that allows the driver to change a speed stage, a shift operation by the sequential shift, a change operation into a sport mode in which a shift point of the automatic transmission is changed to a power performance-oriented side, or a change operation into a first snow mode in which a shift into a predetermined speed stage is restricted. The electronic control unit may be configured to, when the operation related to a shift is carried out, determine to engage the disconnect mechanism when the disconnect mechanism is released. The electronic control unit may be configured to control at least one of the automatic transmission or the disconnect mechanism such that the shift period of the automatic transmission based on the operation related to a shift and the engagement period of the disconnect mechanism at least partially overlap with each other. In this way, when the driver's operation related to a shift is carried out and the disconnect mechanism is released at this time, it is determined to engage the disconnect mechanism. In such a case, both a shift of the automatic transmission and engagement of the disconnect mechanism are carried out, and at least one of the automatic transmission or the disconnect mechanism is controlled such that the shift period of the automatic transmission and the engagement period of the disconnect mechanism overlap with each other. Thus, it is possible to suppress a feeling of strangeness experienced by the driver in the case where the disconnect mechanism is engaged or released separately.

In the above aspect, the electronic control unit may be configured to: when any one of a change operation into an eco-mode in which an electronic throttle opening degree for an accelerator operation amount is changed to a fuel economy-oriented side, a cancellation operation of a second snow mode in which the electronic throttle opening degree for the accelerator operation amount is changed to a low opening degree side, a change operation to activate a cruise control system that controls the vehicle such that a predetermined traveling state is kept, a cancellation operation of a sport mode in which a shift point of the automatic transmission is changed to a power performance-oriented side, and a cancellation operation of a first snow mode in which a shift into a predetermined speed stage is restricted is carried out, determine to release the disconnect mechanism when the disconnect mechanism is engaged; and control at least one of the automatic transmission or the disconnect mechanism such that the shift period of the automatic transmission and the release period of the disconnect mechanism at least partially overlap with each other. When any one of the change operations and the cancellation operations is carried out and the disconnect mechanism is engaged at this time, it is determined to release the disconnect mechanism. By controlling at least one of the automatic transmission or the disconnect mechanism such that the shift period of the automatic transmission and the release period of the disconnect mechanism overlap with each other, it is possible to suppress a feeling of strangeness experienced by the driver in the case where the disconnect mechanism is released separately.

In the above aspect, the electronic control unit may be configured to: when any one of a cancellation operation of an eco-mode in which an electronic throttle opening degree for an accelerator operation amount is changed to a fuel economy-oriented side, a change operation into a second snow mode in which the electronic throttle opening degree for the accelerator operation amount is changed to a low opening degree side, and a cancellation operation of a cruise control system that controls the vehicle such that a predetermined traveling state is kept is carried out, determine to engage the disconnect mechanism when the disconnect mechanism is released; and control at least one of the automatic transmission or the disconnect mechanism such that the shift period of the automatic transmission and the engagement period of the disconnect mechanism at least partially overlap with each other. When any one of the change operations and the cancellation operations is carried out and the disconnect mechanism is released at this time, it is determined to engage the disconnect mechanism. By controlling at least one of the automatic transmission or the disconnect mechanism such that the shift period of the automatic transmission and the engagement period of the disconnect mechanism overlap with each other, it is possible to suppress a feeling of strangeness experienced by the driver in the case where the disconnect mechanism is engaged separately.

In the above aspect, the control system may further include a 4WD switch configured to change into one of the two-wheel drive mode and the four-wheel drive mode. The electronic control unit may be configured to: while the vehicle is traveling in a state where the disconnect mechanism is released, determine to engage the disconnect mechanism when the 4WD switch is operated to change to a four-wheel drive mode side; and, after the 4WD switch is operated to change to the four-wheel drive mode side, when an automatic shift condition that is prescribed based on a traveling state of the vehicle is satisfied, control at least one of the automatic transmission or the disconnect mechanism such that the shift period based on the automatic shift condition and the engagement period of the disconnect mechanism at least partially overlap with each other. While the vehicle is traveling in a state where the disconnect mechanism is released, when the 4WD switch is operated to change to the four-wheel drive mode side, it is determined to engage the disconnect mechanism, and, when the automatic shift condition is satisfied after the change operation, it is determined to automatically shift the automatic transmission. By controlling at least one of the automatic transmission or the disconnect mechanism such that the shift period of the automatic transmission and the engagement period of the disconnect mechanism overlap with each other, it is possible to suppress a feeling of strangeness experienced by the driver in the case where the disconnect mechanism is engaged separately.

In the above aspect, the control system may further include a 4WD switch configured to change into one of the two-wheel drive mode and the four-wheel drive mode. The electronic control unit may be configured to: while the vehicle is traveling in a state where the disconnect mechanism is engaged, determine to release the disconnect mechanism when the 4WD switch is operated to change to a two-wheel drive mode side; and, after the 4WD switch is operated to change to the two-wheel drive mode side, when an automatic shift condition that is prescribed based on a traveling state of the vehicle is satisfied, control at least one of the automatic transmission or the disconnect mechanism such that the shift period of the automatic transmission based on the automatic shift condition and the release period of the disconnect mechanism at least partially overlap with each other. While the vehicle is traveling in a state where the disconnect mechanism is engaged, when the 4WD switch is operated to change to the two-wheel drive mode side, it is determined to release the disconnect mechanism, and, when the automatic shift condition is satisfied after the change operation, it is determined to automatically shift the automatic transmission. By controlling at least one of the automatic transmission or the disconnect mechanism such that the shift period of the automatic transmission and the engagement period of the disconnect mechanism overlap with each other, it is possible to suppress a feeling of strangeness experienced by the driver in the case where the disconnect mechanism is released separately.

In the above aspect, the electronic control unit may be configured to, after a predetermined time elapses from a determination or output of a command to shift the automatic transmission or a substantial start of shift is detected, start engagement or release of the disconnect mechanism. According to the above aspect, because engagement or release of the disconnect mechanism is started during a substantial shift of the automatic transmission, a feeling of strangeness due to, for example, a change in rotational inertia resulting from engagement or release of the disconnect mechanism disappears in a change in the driving force of the automatic transmission, so it is possible to effectively suppress a feeling of strangeness experienced by the driver in the case where the disconnect mechanism is engaged or released separately.

In the above aspect, the electronic control unit may be configured to delay output of a command to shift the automatic transmission with respect to a command to engage or release the disconnect mechanism. According to the above aspect, by delaying the start of shift of the automatic transmission, it is possible to complete engagement or release of the disconnect mechanism during a shift of the automatic transmission, and a feeling of strangeness due to a change in rotational inertia resulting from engagement or release of the disconnect mechanism disappears in a change in the driving force of the automatic transmission, so it is possible to suppress a feeling of strangeness experienced by the driver in the case where the disconnect mechanism is engaged or released separately.

In the above aspect, the electronic control unit may be configured to, when a predetermined condition for engaging or releasing the disconnect mechanism is satisfied, start engagement or release of the disconnect mechanism without waiting for a command to shift the automatic transmission. When the predetermined condition for quickly engaging the disconnect mechanism is satisfied, for example, when there occurs a slip, it is preferable to engage the disconnect mechanism without waiting for a command to shift the automatic transmission. In such a case, by starting engagement of the disconnect mechanism on the basis of fulfillment of the predetermined condition, it is possible to quickly engage the disconnect mechanism.

In the above aspect, the predetermined condition may be a case where it is determined that there is a slip of the vehicle on the basis of the fact that a rotational speed difference between the main drive wheels and the auxiliary drive wheels exceeds a predetermined value or a case where it is determined that the vehicle is in a steady traveling state on the basis of a vehicle speed, accelerator operation amount, steering angle, and the like, of the vehicle and a predetermined time set in advance has elapsed in the steady traveling state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a flowchart for illustrating a relevant portion of control operations of the electronic control unit shown in FIG. 7, that is, control operations for suppressing a feeling of strangeness experienced by a driver during a change of the drive mode between the 2WD-d mode and the 2WD mode or the 4WD mode at the time of changing the drive mode as needed while the vehicle is traveling.

DETAILED DESCRIPTION OF EMBODIMENTS

Hereinafter, embodiments of the invention will be described in detail with reference to the accompanying drawings. In the following embodiments, the drawings are simplified or modified as needed, and the scale ratio, shape, and the like, of each portion are not always accurately drawn.

Figure 1:
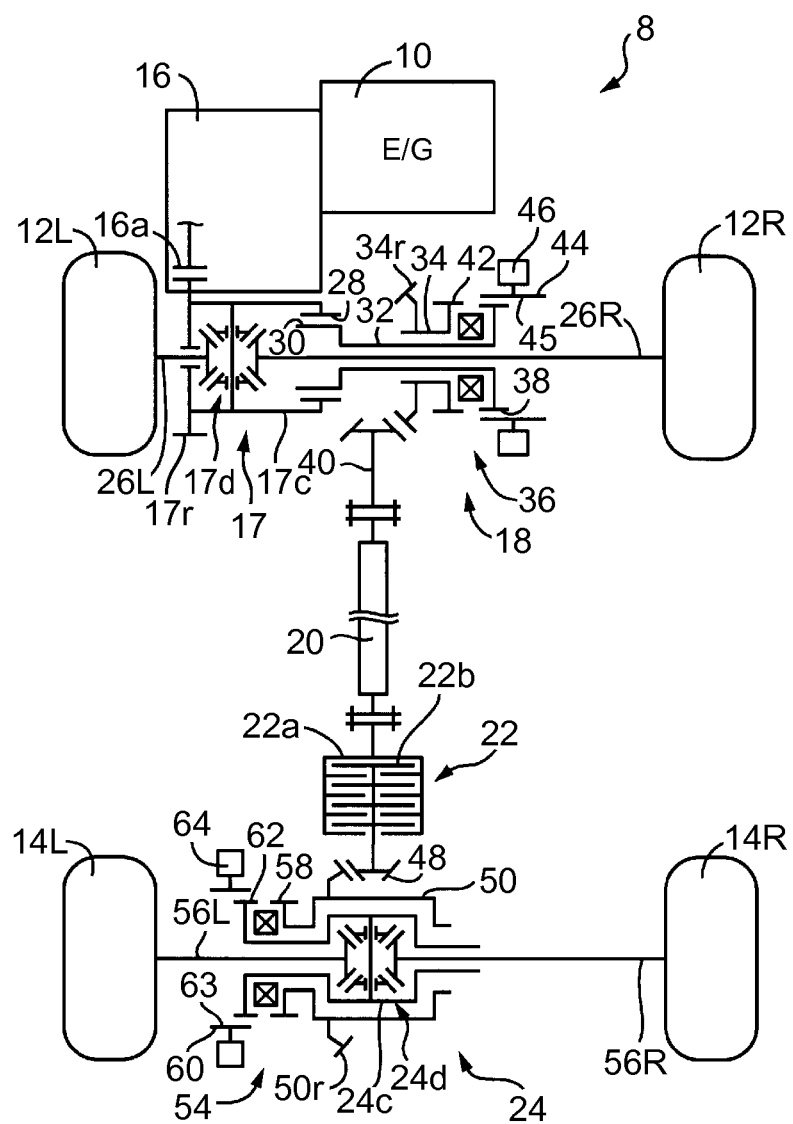
FIG. 1 is a skeletal view that schematically illustrates the configuration of a four-wheel drive vehicle that is an embodiment of the invention.

A first embodiment of the invention will be described. FIG. 1 is a skeletal view that schematically illustrates the configuration of a four-wheel drive vehicle 8 that is an embodiment of the invention. As shown in FIG. 1, the four-wheel drive vehicle 8 includes a four-wheel drive system based on an FF system. The four-wheel drive vehicle 8 includes an engine 10 as a driving source, and includes a first power transmission path and a second power transmission path. The first power transmission path transmits power of the engine 10 to front wheels 12R, 12L (when not particularly distinguished from each other, referred to as front wheels 12). The second power transmission path transmits power of the engine 10 to rear wheels 14R, 14L (when not particularly distinguished from each other, referred to as rear wheels 14). The four-wheel drive vehicle 8 includes an automatic transmission 16, a front differential 17, a transfer 18, a propeller shaft 20, a coupling 22, a rear differential 24, and the like. Although not shown in FIG. 1, a torque converter that is a fluid transmission device is provided between the engine 10 and the automatic transmission 16. The front wheels 12 are examples of main drive wheels to which power is transmitted from an engine while a vehicle is traveling in a two-wheel drive mode or in a four-wheel drive mode according to the invention. The rear wheels 14 are examples of auxiliary drive wheels to which power is transmitted from the engine while the vehicle is traveling in the four-wheel drive mode according to the invention.

The automatic transmission 16 is provided in a power transmission path between the engine 10 and both the front wheels 12 and the rear wheels 14. The automatic transmission 16 is, for example, formed of a stepped automatic transmission. The stepped automatic transmission includes a plurality of planetary gear units and frictional engagement devices (a clutch and a brake). The automatic transmission 16 is configured in accordance with a known technique, so the description of specific structure and operation is omitted.

The front differential 17 (front differential gear) includes a case 17c and a differential mechanism 17d formed of well-known bevel gears. The front differential 17 transmits power while providing appropriate differential rotation to the right and left axles 26R, 26L of the front wheels 12. A ring gear 17r is formed in the case 17c of the front differential 17. The ring gear 17r is in mesh with an output gear 16a that is an output rotating member of the automatic transmission 16. Thus, power that is output from the automatic transmission 16 is input to the ring gear 17r. Internal teeth 28 are formed on the case 17c of the front differential 17. The internal teeth 28 are fitted to external teeth 30 of a first rotating member 32 (described later). The front differential 17 is configured in accordance with a known technique, so the description of specific structure and operation is omitted.

The transfer 18 is provided side by side with the front differential 17. The transfer 18 includes the first rotating member 32, a second rotating member 34 and a first clutch 36. The external teeth 30 are formed on the first rotating member 32. A ring gear 34r for transmitting power toward the rear wheels 14 is formed in the second rotating member 34. The first clutch 36 is formed of a dog clutch that selectively connects the first rotating member 32 to the second rotating member 34 or disconnects the first rotating member 32 from the second rotating member 34.

The first rotating member 32 has a cylindrical shape. The axle 26R extends through the radially inner side of the first rotating member 32. The external teeth 30 are formed at one side of the first rotating member 32 in the axial direction. The external teeth 30 are fitted to the internal teeth 28 formed on the case 17c. Thus, the first rotating member 32 is connected to the case 17c of the front differential 17 such that power is transmittable. Clutch teeth 38 that constitute the first clutch 36 are formed at the other side of the first rotating member 32 in the axial direction.

The second rotating member 34 has a cylindrical shape. The axle 26R and the first rotating member 32 extend through the radially inner side of the second rotating member 34. The ring gear 34r that is in mesh with a driven pinion 40 is formed at one side of the second rotating member 34 in the axial direction. Clutch teeth 42 that constitute the first clutch 36 are formed at the other side of the second rotating member 34 in the axial direction. The driven pinion 40 is connected to the propeller shaft 20, and is further connected to a rotating element 22a of the coupling 22 via the propeller shaft 20.

The first clutch 36 is a dog clutch for connecting the first rotating member 32 to the second rotating member 34 or disconnecting the first rotating member 32 from the second rotating member 34. The first clutch 36 includes the clutch teeth 38, the clutch teeth 42, a sleeve 44 and an actuator 46. The clutch teeth 38 are formed on the first rotating member 32. The clutch teeth 42 are formed on the second rotating member 34. Internal teeth 45 are formed in the sleeve 44. The internal teeth 45 are able to be in mesh with the clutch teeth 38 and the clutch teeth 42. The actuator 46 electrically (electromagnetically) actuates the sleeve 44 in the axial direction. The first clutch 36 may further include a synchronization mechanism.

FIG. 1 shows a state where the first clutch 36 is released. At this time, the first rotating member 32 is disconnected from the second rotating member 34, so no power is transmitted to the rear wheels 14. On the other hand, when the sleeve 44 is displaced and then the clutch teeth 38 and the clutch teeth 42 both mesh with the internal teeth 45 of the sleeve 44, the first clutch 36 is engaged, and the first rotating member 32 is connected to the second rotating member 34. Thus, when the first rotating member 32 rotates, the second rotating member 34, the driven pinion 40, the propeller shaft 20 and the rotating element 22a of the coupling 22 are rotated.

The coupling 22 is provided between the propeller shaft 20 and the rear differential 24. The coupling 22 transmits torque between the rotating element 22a and the other rotating element 22b. The coupling 22 is an electronically controlled coupling formed of, for example, a wet-type multi-disc clutch. The coupling 22 is able to continuously change the distribution of torque between the front and rear wheels within the range of 100:0 to 50:50 by controlling the torque transmitted by the coupling 22. Specifically, when current is supplied to an electromagnetic solenoid (not shown) that controls the torque transmitted by the coupling 22, the coupling 22 is engaged with an engagement force directly proportional to the value of the current supplied. For example, when no current is supplied to the electromagnetic solenoid, the engagement force of the coupling 22 becomes zero, that is, the transmitted torque becomes zero, so the distribution of torque between the front and rear wheels is set to 100:0. When the current value of the electromagnetic solenoid increases and the coupling 22 is completely engaged, the distribution of torque between the front and rear wheels is set to 50:50. In this way, as the value of current that is supplied to the electromagnetic solenoid increases, the distribution of torque that is transmitted to the rear wheel side increases. By controlling the current value, it is possible to continuously change the distribution of torque between the front and rear wheels. The coupling 22 is configured in accordance with a known technique, so the description of specific structure and operation is omitted.

The rotating element 22b of the coupling 22 is connected to a drive pinion 48. The drive pinion 48 is in mesh with a ring gear 50r that is formed in a third rotating member 50 (described later).

The third rotating member 50 is formed in a cylindrical shape. A differential mechanism 24d that constitutes the rear differential 24 (described later) is accommodated radially inward of the third rotating member 50. The ring gear 50r that is in mesh with the drive pinion 48 is formed in the third rotating member 50. Clutch teeth 58 that constitute a second clutch 54 (described later) are formed at one end of the third rotating member 50 in the axial direction.

The rear differential 24 includes a case 24c and a differential mechanism 24d formed of well-known bevel gears. Clutch teeth 62 that constitute the second clutch 54 (described later) are formed at one side of the case 24c of the rear differential 24 in the axial direction. The rear differential 24 transmits power while providing appropriate differential rotation to the right and left axles 56R, 56L of the rear wheels 14. The rear differential 24 is configured in accordance with a known technique, so the description of the specific structure and operation of the rear differential 24 is omitted.

The second clutch 54 is a dog clutch for connecting the third rotating member 50 to the rear wheels 14 (rear differential 24) or disconnecting the third rotating member 50 from the rear wheels 14 (rear differential 24). The second clutch 54 includes the clutch teeth 58, the clutch teeth 62, a cylindrical sleeve 60 and an actuator 64. The actuator 64 electrically (electromagnetically) actuates the sleeve 60 in the axial direction. Internal teeth 63 that are able to be in mesh with the clutch teeth 58 and the clutch teeth 62 are formed on the inner periphery of the sleeve 60. A meshing state between the clutch teeth 58, 62 and the internal teeth 63 of the sleeve 60 is changed by electrically (electromagnetically) controlling the position of the sleeve 60 through the second actuator 65. The second clutch 54 includes a synchronization mechanism.

FIG. 1 shows a state where the second clutch 54 is released. At this time, the third rotating member 50 is disconnected from the rear differential 24. On the other hand, when the clutch teeth 58 and the clutch teeth 62 both mesh with the internal teeth 63 of the sleeve 60, the third rotating member 50 is connected to the rear differential 24.

In the thus configured four-wheel drive vehicle 8, for example, when the first clutch 36 and the second clutch 54 are engaged and the torque transmitted by the coupling 22 is controlled to a value larger than zero, a driving force based on the torque transmitted by the coupling 22 is also transmitted to the rear wheels 14. Thus, power is transmitted to both the front wheels 12 and the rear wheels 14, and a four-wheel drive mode (4WD mode) is established. In this four-wheel drive mode, by controlling the torque transmitted by the coupling 22, the distribution of torque between the front and rear wheels is adjusted as needed. Hereinafter, the four-wheel drive mode is referred to as 4WD mode.

When the first clutch 36 and the second clutch 54 are released, the first rotating member 32 is disconnected from the second rotating member 34, so no power is transmitted to the rear wheels 14. That is, a two-wheel drive mode in which only the front wheels 12 are driven is established. Furthermore, because the third rotating member 50 is disconnected from the rear differential 24, transmission of power to the rotating elements that constitute the power transmission path (the second rotating member 34, the driven pinion 40, the propeller shaft 20, the coupling 22, the drive pinion 48 and the third rotating member 50) from the second rotating member 34 to the third rotating member 50 is interrupted (isolated) from the engine 10 or the rear wheels 14 while the vehicle is traveling in the two-wheel drive mode. Thus, rotation of these rotating elements is in a stopped state, and co-rotation of each of the rotating elements is prevented while the vehicle is traveling in the two-wheel drive mode. In this way, because co-rotation of each of the rotating elements while the vehicle is traveling in the two-wheel drive mode is eliminated, running resistance is reduced, and fuel efficiency improves. Each of the rotating elements (the second rotating member 34, the driven pinion 40, the propeller shaft 20, the coupling 22, the drive pinion 48 and the third rotating member 50) that constitute the power transmission path from the second rotating member 34 to the third rotating member 50 is one example of a predetermined rotating element for transmitting power to auxiliary drive wheels in a four-wheel drive mode according to the invention. The first clutch 36 and the second clutch 54 are provided in a power transmission path between the automatic transmission and the auxiliary drive wheels. The pair of first clutch 36 and second clutch 54 is an example of the disconnect mechanism that disconnects the predetermined rotating element from the engine and the auxiliary drive wheels while the vehicle is traveling in the two-wheel drive mode. The predetermined rotating element is used to transmit power to the auxiliary drive wheels while the vehicle is traveling in the four-wheel drive mode. Hereinafter, the following two-wheel drive mode is referred to as 2WD-d mode. In this two-wheel drive mode, the pair of first clutch 36 and second clutch 54, that is, an example of the disconnect mechanism according to the invention, are released and the vehicle travels in a state where co-rotation of each rotating element is prevented.

When the first clutch 36 and the second clutch 54 are engaged and the coupling 22 is released, the propeller shaft 20 is disconnected from the drive pinion 48, so no power is transmitted to the rear wheels 14. That is, the two-wheel drive mode in which only the front wheels 12 are driven is established. However, the first clutch 36 and the second clutch 54 are engaged, so each of the rotating elements that constitute the power transmission path from the second rotating member 34 to the third rotating member 50 and each of the rotating elements that constitute the power transmission path from the other rotating element 22b of the coupling 22 to the rear wheels 14 co-rotate. In this way, although the vehicle travels in the two-wheel drive mode, the rotating elements co-rotate, so fuel efficiency decreases with an increase in running resistance. However, at the time of changing from the two-wheel drive mode to the four-wheel drive mode, it is just required to engage the coupling 22. Thus, it is possible to quickly change the drive mode. Hereinafter, the two-wheel drive mode in a state where the first clutch 36 and the second clutch 54 are engaged (in a state where co-rotation occurs) is referred to as 2WD mode.

The four-wheel drive vehicle 8 is changed as needed among the 2WD-d mode, the 2WD mode and the 4WD mode by controlling the engaged/released state of each of the first clutch 36 and the second clutch 54 and the torque transmitted by the coupling 22 on the basis of the traveling state of the vehicle.

Figure 2:
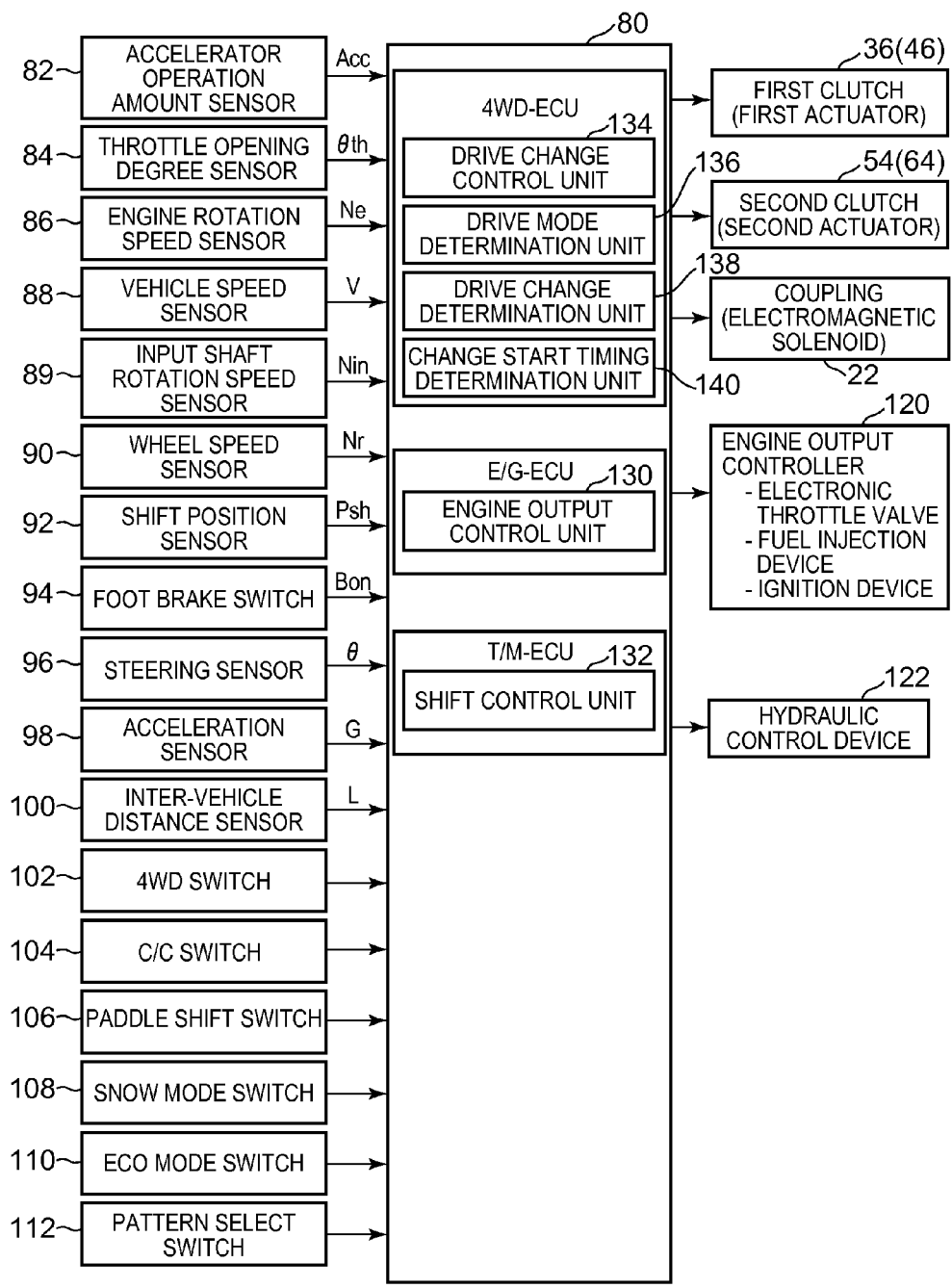
FIG. 2 is a functional block diagram that illustrates a control system of an electronic control unit that controls the four-wheel drive vehicle shown in FIG. 1 and that illustrates a relevant portion of control functions associated with a change of a front/rear wheel driving state (described later)

FIG. 2 is a functional block diagram that illustrates a control system of an electronic control unit 80 that controls the vehicle 8 and that illustrates a relevant portion of control functions associated with a change of a front/rear wheel driving state (described later). The electronic control unit 80 includes a so-called microcomputer including, for example, a CPU, a RAM, a ROM, input/output interfaces, and the like. The CPU executes various controls over the vehicle 8 by executing signal processing in accordance with a program stored in the ROM in advance while utilizing the temporary storage function of the RAM. For example, the electronic control unit 80 executes output control over the engine 10, shift control over the automatic transmission 16, engage/release control over each of the first clutch 36 and the second clutch 54, torque capacity control over the coupling 22, and the like. The electronic control unit 80 according to the present embodiment may be formed of a plurality of control units, such as an E/G-ECU, a 4WD-ECU and a T/M-ECU, as shown in FIG. 2, or may be formed of a single control unit. The E/G-ECU controls the output of the engine 10. The 4WD-ECU controls the driving state of the front/rear wheels. The T/M-ECU controls a shift state of the automatic transmission 16.

As shown in FIG. 2, a signal indicating an accelerator operation amount Acc, a signal indicating a throttle opening degree θth of an electronic throttle valve, a signal indicating an engine rotation speed Ne, a signal indicating a vehicle speed V, a signal indicating a vehicle speed V, a signal indicating an input shaft rotation speed Nin of the automatic transmission 16, a signal indicating Nr, a signal indicating a shift position (operating position) Psh of a shift lever, a signal indicating an operating state of a foot brake Bon, a signal indicating a steering angle θ, a signal indicating a vehicle longitudinal acceleration G, a signal indicating an inter-vehicle distance L from a preceding vehicle, a signal indicating a change of the front/rear wheel driving state of the vehicle 8, a change signal into a cruise control system, a signal indicating a command to shift the automatic transmission 16, a change signal into a snow mode, a change signal into an eco-mode, change signals into various driving modes, and the like, are supplied to the electronic control unit 80. The accelerator operation amount Acc corresponds to an operation amount of an accelerator pedal, which is detected by an accelerator operation amount sensor 82. The throttle opening degree θth is detected by a throttle opening degree sensor 84. The engine rotation speed Ne is detected by an engine rotation speed sensor 86. The vehicle speed V corresponds to an output shaft rotation speed Nout of the automatic transmission 16, and is detected by a vehicle speed sensor 88. The input shaft rotation speed Nin is detected by an input shaft rotation speed sensor 89. Nr is a rotation speed of each wheel, and is detected by a wheel speed sensor 90. The shift position (operating position) Psh of the shift lever is detected by a shift position sensor 92. The operating state of the foot brake Bon is detected by a foot brake switch 94. The steering angle θ is detected by a steering sensor 96. The vehicle longitudinal acceleration G is detected by an acceleration sensor 98. The inter-vehicle distance L to a preceding vehicle is detected by an inter-vehicle distance sensor 100. The change of the front/rear wheel driving state of the vehicle 8 is detected by a 4WD switch 102. The change signal into the cruise control system is detected by a C/C switch 104. The command to shift the automatic transmission 16 is detected by a paddle shift switch 106. The change signal into the snow mode is detected by a snow mode switch 108. The change signal into the eco-mode is detected by an eco-mode switch 110. The change signals into various driving modes are detected by a pattern select switch 112. The pattern select switch 112 is configured to be able to select a plurality of driving modes. The plurality of driving modes include a sport mode and a first snow mode (described later). In the sport mode, shift points of the automatic transmission 16 are changed to a power performance-oriented side.

In the present embodiment, the driving mode is configured to be changeable into the snow modes by the snow mode switch 108 and the pattern select switch 112; however, the snow mode that is executed by the snow mode switch 108 and the snow mode that is executed by the pattern select switch 112 are different from each other in specific manner. Specifically, in the snow mode in the case where the snow mode switch 108 is selected, the throttle opening degree θth for the accelerator operation amount Acc is changed toward a low opening degree side as compared to an ordinary traveling state. The correlation of the throttle opening degree θth with the accelerator operation amount Acc in the case where this snow mode is selected is preset and stored. In the case of the snow mode into which the driving mode is changed by the pattern select switch 112, a shift of the automatic transmission 16 into a predetermined speed stage is restricted. For example, a shift of the automatic transmission 16 into a first speed stage is prohibited. Alternatively, the automatic transmission 16 is shifted into a predetermined speed stage (for example, second speed stage). The snow mode in which a shift of the automatic transmission 16 into the predetermined speed stage is restricted is an example of a first snow mode according to the invention. The snow mode in which the throttle opening degree θth for the accelerator operation amount Acc is changed toward a low opening degree side as compared to an ordinary traveling state is an example of a second snow mode according to the invention. Hereinafter, the snow mode in which a shift of the automatic transmission 16 into the predetermined speed stage is restricted is defined as the first snow mode, and the snow mode in which the throttle opening degree θth for the accelerator operation amount Acc is changed toward a low opening degree side as compared to an ordinary traveling state is defined as a second snow mode.

An engine output control command signal for output control over the engine 10 is supplied from the electronic control unit 80 to an engine output controller 120. Specifically, a throttle valve opening degree signal, an injection signal, an ignition timing signal, and the like, are output from the electronic control unit 80. The throttle valve opening degree signal is used to drive a throttle actuator for controlling the throttle valve opening degree θth of the electronic throttle valve. The injection signal is used to control the amount of fuel that is injected from a fuel injection device. The ignition timing signal is used to control the ignition timing of the engine 10 by using an ignition device. A shift command signal is output from the electronic control unit 80 to a hydraulic control device 122. The hydraulic control device 122 controls the shift state of the automatic transmission 16. An operation signal for the first actuator 46, an operation signal for the second actuator 64, a transmitted torque signal to an electromagnetic solenoid (not shown), and the like, are output from the electronic control unit 80. The first actuator 46 changes between the engaged and released states of the first clutch 36. The second actuator 64 changes between the engaged and released states of the second clutch 54. The electromagnetic solenoid (not shown) controls the torque transmitted by the coupling 22.

The electronic control unit 80 functionally includes an engine output control unit 130, a shift control unit 132, a drive change control unit 134, a drive mode determination unit 136, a drive change determination unit 138 and a change start timing determination unit 140. In FIG. 2, the 4WD-ECU functionally includes the drive change control unit 134, the drive mode determination unit 136, the drive change determination unit 138 and the change start timing determination unit 140, the E/G-ECU functionally includes the engine output control unit 130, and the T/M-ECU functionally includes the shift control unit 132. These ECUs are not limited to including the above-described functions.

The engine output control unit 130 calculates a required driving force Tr on the basis of an actual accelerator operation amount Acc (or actual throttle opening degree θth) and an actual vehicle speed V by consulting a driving force map obtained and stored in advance. The driving force map uses a traveling state of the vehicle, such as the accelerator operation amount Acc (or the throttle opening degree θth) and the vehicle speed V as variables. The engine output control unit 130 calculates an engine torque Te to be output from the engine 10 in further consideration of a speed ratio of the automatic transmission 16, and the like. The engine output control unit 130 outputs a command signal to the engine output controller 120 such that the calculated engine torque Te is obtained.

For example, when the shift position Psh is D position that is an automatically shiftable forward traveling position, the shift control unit 132 carries out a shift on the basis of a preset automatic shift condition that is prescribed based on a traveling condition of the vehicle. Specifically, for example, the shift control unit 132 determines a target speed stage on the basis of the actual accelerator operation amount Acc (or actual throttle opening degree θth) and the actual vehicle speed V by consulting a shift map, and outputs, to the hydraulic control device 122, a command to shift into the determined speed stage. The shift map uses the accelerator operation amount Acc (or the throttle opening degree θth) and the vehicle speed V as variables. A shift based on the shift map is included in a shift based on a shift condition (automatic shift condition) of an automatic transmission according to the invention.

When the shift position Psh of the shift lever is changed to M position and then the shift lever is further operated from the M position to upshift the automatic transmission 16 or operated to downshift the automatic transmission 16, the shift control unit 132 outputs, to the hydraulic control device 122, a command to shift into the selected speed stage determined on the basis of the operation. The M position corresponds to a sequential shift by which it is possible to shift (change) into a selected speed stage by driver's operation. For example, when the shift lever is operated from the M position to an upshift side once, the speed stage is shifted into a speed stage higher in speed by one stage than a current speed stage. When the shift lever is operated from the M position to a downshift side once, the speed stage is shifted into a speed stage lower in speed by one stage than the current speed stage. This change operation in the M position is an example of a change operation by the sequential shift according to the invention. The upshift operation or downshift operation in the M position is an example of a shift operation by the sequential shift according to the invention.

When the paddle shift switch 106 provided on a steering wheel is manually operated toward an upshift side or a downshift side, the shift control unit 132 outputs, to the hydraulic control device 122, a command to shift into a speed stage that is determined on the basis of the manual operation. For example, when the paddle shift switch 106 is operated toward the upshift side once, the speed stage is shifted to a speed stage higher in speed by one stage than the current speed stage. When the paddle shift switch 106 is operated toward the downshift side once, the speed stage is shifted into a speed stage lower in speed by one stage than the current speed stage. In a shift that is carried out by using the paddle shift switch 106, a shift is temporarily carried out even when the shift position Psh of the shift lever is set in the automatically shiftable D position. The shift operation by using the paddle shift switch 106 is an example of a shift operation by the sequential shift by which it is possible for a driver to change a speed stage according to the invention.

When the drive change control unit 134 receives a command to change from any one of the 2WD-d mode, the 2WD mode and the 4WD mode to another drive mode on the basis of the drive change determination unit 138 (described later), the drive change control unit 134 executes control for changing into the selected drive mode.

For example, when the drive change control unit 134 receives a command to change from the 2WD-d mode to the 2WD mode or the 4WD mode, the drive change control unit 134 executes control for engaging the first clutch 36 and the second clutch 54. Specifically, initially, by electrically (electromagnetically) controlling the second actuator 64 that changes between the engaged and released states of the second clutch 54, the sleeve 60 is moved to a preset position at which the internal teeth 63 of the sleeve 60 mesh with the clutch teeth 58 of the third rotating member 50 and the clutch teeth 62 of the case 24c. Thus, the second clutch 54 is engaged. At this time, the third rotating member 50 and the case 24c are synchronized with each other by a synchronization mechanism provided in the second clutch 54, with the result that smooth movement of the sleeve 60 is possible. Subsequently, engagement of the coupling 22 is carried out. When the coupling 22 is engaged, the first rotating member 32 and the second rotating member 34 are synchronized with each other in the first clutch 36. By electrically (electromagnetically) controlling the first actuator 46 of the first clutch 36 in this state, the sleeve 44 of the first clutch 36 is moved to a preset position at which the internal teeth 45 of the sleeve 44 mesh with the clutch teeth 38 of the first rotating member 32 and the clutch teeth 42 of the second rotating member 34. Thus, the second clutch 54 is engaged. When the drive mode is changed into the 2WD mode, the coupling 22 is released additionally.

For example, when the drive mode is changed from the 4WD mode or the 2WD mode to the 2WD-d mode, the drive change control unit 134 initially releases the coupling 22 in the case of the 4WD mode. When the coupling 22 is released to interrupt the torque transmitted to the rear wheels 14, the drive change control unit 134 executes control for releasing the first clutch 36 and the second clutch 54. Specifically, the sleeve 44 is moved by controlling the first actuator 46 to a position at which the first clutch 36 is released, and the sleeve 60 is moved by controlling the second actuator 64 to a position at which the second clutch 54 is released.

The drive mode determination unit 136 determines whether the drive mode of the four-wheel drive vehicle 8 is the 2WD-d mode. The drive mode determination unit 136 detects the engaged or released state of the first clutch 36 by detecting the position of the sleeve 44 of the first clutch 36 or a rotational speed difference between the rotating elements of the first clutch 36. The drive mode determination unit 136 detects the engaged or released state of the second clutch 54 by detecting the position of the sleeve 60 of the second clutch 54 or a rotational speed difference between the rotating elements of the second clutch 54. When the released state of the first clutch 36 and the released state of the second clutch 54 have been detected, the drive mode determination unit 136 determines that the drive mode is the 2WD-d mode.

The drive change determination unit 138 determines whether to change the engaged or released state of each of the first clutch 36 and the second clutch 54 on the basis of the drive mode that is determined by the drive mode determination unit 136 and a driver's predetermined operation.

When the drive change determination unit 138 detects a change operation into the sequential shift or a shift operation by the sequential shift while the vehicle is traveling in the 2WD-d mode, the drive change determination unit 138 changes into the 2WD mode or the 4WD mode by engaging the first clutch 36 and the second clutch 54. With the sequential shift, the driver is allowed to change (shift) into a selected speed stage while the vehicle is traveling. The change operation into the sequential shift is determined on the basis of the fact that the shift lever is changed into the M position (manual shift position) in which the driver is allowed to shift into a selected speed stage. The shift operation by the sequential shift is determined on the basis of the fact that the shift lever is operated to upshift or operated to downshift from a state where the shift lever is changed to the M position. Furthermore, the shift operation by the sequential shift is determined on the basis of the fact that the paddle shift switch 106 provided on the steering wheel is operated to upshift or operated to downshift. When the change operation into the sequential shift is carried out, because the driver gives a higher priority to the traveling performance of the vehicle, the 4WD mode that allows the distribution of driving force between the front and rear wheels or the 2WD mode that can be quickly changed to the 4WD mode is preferable. Thus, when the change operation into the sequential shift is carried out while the vehicle is traveling in the 2WD-d mode or shift operation by the sequential shift is carried out, it is determined to change from the 2WD-d mode to the 2WD mode or the 4WD mode.

When changed into the sequential shift and further operated to shift into a speed stage selected by the driver, the shift control unit 132 executes shift control for shifting into the speed stage selected by the driver. That is, when changed into the sequential shift in the 2WD-d mode and a shift operation is carried out, a determination to shift the automatic transmission 16 and a determination to change into the 2WD mode or the 4WD mode by engaging the first clutch 36 and the second clutch 54 (hereinafter, when not particularly distinguished from each other, referred to as clutches 36, 54) are carried out at the same time. In other words, the shift operation by the sequential shift, which corresponds to a shift by a driver, is in common with an operation related to engagement or release of the clutches 36, 54. At this time, at least one of the automatic transmission 16 or the pair of clutches 36, 54 is controlled such that a shift period (shift interval, shift process) of the automatic transmission 16 and a change period (an engagement period of the clutches 36, 54) into the 2WD mode or the 4WD mode at least partially overlap with each other.

If the automatic transmission 16 is configured to downshift by one stage from the current speed stage when changed into the M position corresponding to the sequential shift, the shift control unit 132 determines to downshift the automatic transmission 16 when changed into the sequential shift. That is, when changed into the sequential shift in the 2WD-d mode, a determination to shift the automatic transmission 16 and a determination to change from the 2WD-d mode to the 2WD mode or the 4WD mode are carried out at the same time. In other words, the change operation into the sequential shift, which corresponds to a shift by the driver, is in common with the operation related to engagement or release of the clutches 36, 54. At this time, at least one of the automatic transmission 16 or the pair of clutches 36, 54 is controlled such that the shift period of the automatic transmission 16 and the change period (the engagement period of the clutches 36, 54) into the 2WD mode or the 4WD mode at least partially overlap with each other.

The change start timing determination unit 140 determines the timing at which engagement of the clutches 36, 54 is started. The change start timing determination unit 140 outputs a command to shift the automatic transmission 16, and then determines whether a predetermined time t1 set in advance has elapsed. The predetermined time t1 is a value empirically obtained in advance, and is set to, for example, a time from when the shift command is output to when inertia phase is started, that is, when a substantial shift is started. When the predetermined time t1 elapses, the change start timing determination unit 140 determines to start engagement of the clutches 36, 54, and outputs a command to engage the clutches 36, 54. Alternatively, when the change start timing determination unit 140 detects the start of the inertia phase on the basis of the input shaft rotation speed Nin of the automatic transmission 16, the change start timing determination unit 140 determines to start engagement of the clutches 36, 54, and outputs a command to engage the clutches 36, 54. The drive change control unit 134 starts engagement of the clutches 36, 54 upon reception of a command to engage the clutches 36, 54 from the change start timing determination unit 140.

Thus, the clutches 36, 54 are engaged during the inertia phase of the automatic transmission 16, that is, during a change in the output torque of the automatic transmission 16 (during a change in driving force). Thus, a feeling of strangeness due to an increase in rotational inertia during engagement of the clutches 36, 54 disappears in a change in driving force in a shift transitional period of the automatic transmission 16. That is, an increase in rotational inertia resulting from engagement of the clutches 36, 54 occurs during a change in driving force caused by a shift of the automatic transmission 16. Thus, a feeling of strangeness experienced by the driver during engagement of the clutches 36, 54 disappears in a feeling of strangeness caused by a change in the driving force of the automatic transmission 16. As a result, it is possible to suppress a feeling of strangeness experienced by the driver in the case where the clutches 36, 54 are engaged separately. In this way, when it is determined to engage the clutches 36, 54, engagement of the clutches 36, 54 is started in synchronization with a shift of the automatic transmission 16. Thus, a feeling of strangeness experienced by the driver during engagement of the clutches 36, 54 is suppressed.

When the change start timing determination unit 140 is activated, the start of engagement of the clutches 36, 54 is delayed. In the four-wheel drive vehicle 8, when the clutches 36, 54 are engaged, it is required to engage the coupling 22. Therefore, when it is determined to engage the clutches 36, 54, a command (precharge command) is output to control the coupling 22 in advance to a state just before the torque capacity arises. Thus, it is possible to quickly engage the clutches 36, 54.

When the drive change determination unit 138 detects a change operation into the sport mode as a result of select operation carried out on the pattern select switch 112 while the vehicle is traveling in the 2WD-d mode, the drive change determination unit 138 determines to change from the 2WD-d mode to the 4WD mode. In the sport mode, the shift points (shift map) of the automatic transmission 16 are changed toward a power performance-oriented side. This is presumably because, when changed into the sport mode by the driver, the driver desires to improve the running performance of the vehicle. When changed into the sport mode, the shift control unit 132 determines whether to shift the automatic transmission 16 on the basis of the changed shift map, so the shift control unit 132 may determine to shift the automatic transmission 16 accordingly. Thus, when changed into the sport mode, it is determined to change into the 4WD mode and to shift the automatic transmission 16 at the same time. That is, the change operation into the sport mode is in common with the shift operation of the automatic transmission 16 and the change operation into the 4WD mode (an operation to engage the clutches 36, 54). In such a case, at least one of the automatic transmission 16 or the pair of clutches 36, 54 is controlled such that the shift period of the automatic transmission 16 and the change period into the 4WD mode (the engagement period of the clutches 36, 54) at least partially overlap with each other.

Specifically, the above-described change start timing determination unit 140, for example, executes control such that engagement of the clutches 36, 54 is started at the timing at which the inertia phase of the automatic transmission 16 is started. Even when controlled as described above, because the clutches 36, 54 are engaged during the inertia phase of the automatic transmission 16, a feeling of strangeness experienced by the driver is suppressed during engagement of the clutches 36, 54. This change operation into the sport mode is an example of an operation related to a shift by the driver and a predetermined operation related to engagement or release of the disconnect mechanism according to the invention.

When the drive change determination unit 138 detects a cancellation operation to cancel the sport mode by using the pattern select switch 112 while the vehicle is traveling in the sport mode, that is, while the vehicle is traveling in the 4WD mode, the drive change determination unit 138 determines to change from the 4WD mode to the 2WD-d mode. When the cancellation operation of the sport mode is carried out, the driver places importance on fuel economy, so it is desired to change into the 2WD-d mode for the purpose of improving fuel economy. When the sport mode is cancelled, the shift map of the automatic transmission 16 returns to a shift map for ordinary traveling, so it may be determined to shift the automatic transmission 16 accordingly. Thus, when the sport mode is cancelled, it is determined to change into the 2WD-d mode and to shift the automatic transmission 16 at the same time. In such a case, at least one of the automatic transmission 16 or the pair of clutches 36, 54 is controlled such that the shift period of the automatic transmission 16 and the change period into the 2WD-d mode (release period of the clutches 36, 54) at least partially overlap with each other.

Specifically, the above-described change start timing determination unit 140, for example, executes control such that release of the clutches 36, 54 is started at the timing at which the inertia phase of the automatic transmission 16 is started. Even when controlled as described above, because the clutches 36, 54 are released during the inertia phase of the automatic transmission 16, a feeling of strangeness experienced by the driver is suppressed during release of the clutches 36, 54. The cancellation operation of the sport mode is an example of the predetermined operation related to engagement or release of the disconnect mechanism according to the invention.

When the drive change determination unit 138 detects the change operation into the first snow mode as a result of an operation of the pattern select switch 112 during the 2WD-d mode, the drive change determination unit 138 determines to change from the 2WD-d mode to the 4WD mode. In the first snow mode, a shift into a predetermined speed stage is restricted. This is because, when the snow mode is selected by using the pattern select switch 112, the 4WD mode is carried out for the purpose of suppressing a slip. In the 4WD mode, it is allowed to distribute driving force between the front and rear wheels.

When changed into the first snow mode, the shift control unit 132 restricts (prohibits) a shift into the predetermined speed stage (for example, first speed stage). At this time, when the speed stage of the automatic transmission 16 is the predetermined speed stage, the shift control unit 132 is configured to upshift the automatic transmission 16 in order to avoid the predetermined speed stage. Thus, when the automatic transmission 16 is in the predetermined speed stage at the time when changed into the first snow mode, it is determined to shift into a speed stage other than the predetermined speed stage. Thus, when changed into the snow mode by operating the pattern select switch 112 while the vehicle is traveling in the 2WD-d mode, it is determined to engage the clutches 36, 54, and it is determined to shift the automatic transmission 16. That is, the change operation into the first snow mode is in common with the shift operation of the automatic transmission 16 and the change operation into the 4WD mode (an operation to engage the clutches 36, 54). In such a case, at least one of the automatic transmission 16 or the pair of clutches 36, 54 is controlled such that the shift period of the automatic transmission 16 and the change period into the 4WD mode (the engagement period (engagement process, engagement interval) of the clutches 36, 54) at least partially overlap with each other.

Specifically, the above-described change start timing determination unit 140, for example, executes control such that engagement of the clutches 36, 54 is started at the timing at which the inertia phase of the automatic transmission 16 is started. Even when controlled as described above, because the clutches 36, 54 are engaged during the inertia phase of the automatic transmission 16, a feeling of strangeness experienced by the driver is suppressed during engagement of the clutches 36, 54. The change operation into the first snow mode is an example of the operation related to a shift by the driver and the predetermined operation related to engagement or release of the disconnect mechanism according to the invention.

When the drive change determination unit 138 detects a cancellation operation to cancel the first snow mode by using the pattern select switch 112 while the vehicle is traveling in the first snow mode, that is, while the vehicle is traveling in the 4WD mode, the drive change determination unit 138 changes from the 4WD mode to the 2WD-d mode. When the first snow mode is cancelled, a shift into the predetermined speed stage of the automatic transmission 16, which has been restricted (prohibited), is permitted. Thus, when it is determined to cancel the first snow mode in the case where it is determined to shift into the predetermined speed stage on the basis of the automatic shift condition of the automatic transmission 16, it is determined to shift into the predetermined speed stage. In such a case, at least one of the automatic transmission 16 or the pair of clutches 36, 54 is controlled such that the shift period of the automatic transmission 16 into the predetermined speed stage and the change period into the 2WD-d mode (the release period of the clutches 36, 54) at least partially overlap with each other.

Specifically, the above-described change start timing determination unit 140, for example, executes control such that release of the clutches 36, 54 is started at the timing at which the inertia phase of the automatic transmission 16 is started. Even when controlled as described above, because the clutches 36, 54 are released during the inertia phase of the automatic transmission 16, a feeling of strangeness experienced by the driver is suppressed during release of the clutches 36, 54. The cancellation operation of the first snow mode is an example of the predetermined operation related to engagement or release of the disconnect mechanism according to the invention.

When the drive change determination unit 138 detects the change operation into the second snow mode as a result of an operation of the snow mode switch 108 during the 2WD-d mode, the drive change determination unit 138 determines to change from the 2WD-d mode to the 4WD mode. In the second snow mode, the throttle opening degree θth for the accelerator operation amount Acc is changed toward a low opening degree side. This is because, as in the case of the first snow mode, the 4WD mode is carried out for the purpose of suppressing a slip. In the 4WD mode, it is allowed to distribute driving force between the front and rear wheels.

When changed into the second snow mode, it is determined to change from the 2WD-d mode to the 4WD mode. At this time, when a determination is made to shift the automatic transmission 16 based on the automatic shift condition, it is also determined to shift the automatic transmission 16. In such a case, at least one of the automatic transmission 16 or the pair of clutches 36, 54 is controlled such that the shift period of the automatic transmission 16 and the change period into the 4WD mode (the engagement period of the clutches 36, 54) at least partially overlap with each other.

Specifically, the above-described change start timing determination unit 140, for example, executes control such that engagement of the clutches 36, 54 is started at the timing at which the inertia phase of the automatic transmission 16 is started. Even when controlled as described above, because the clutches 36, 54 are engaged during the inertia phase of the automatic transmission 16, a feeling of strangeness experienced by the driver is suppressed during engagement of the clutches 36, 54. The change operation into the second snow mode is an example of the predetermined operation related to engagement or release of the disconnect mechanism according to the invention.

When the drive change determination unit 138 detects the cancellation operation to cancel the second snow mode by using the snow mode switch 108 while the vehicle is traveling in the second snow mode, that is, while the vehicle is traveling in the 4WD mode, the drive change determination unit 138 determines to change from the 4WD mode to the 2WD-d mode. At this time, when it is further determined to shift the automatic transmission 16 based on the automatic shift condition, at least one of the automatic transmission 16 or the pair of clutches 36, 54 is controlled such that the shift period of the automatic transmission 16 and the change period into the 2WD-d mode (the release period of the clutches 36, 54) at least partially overlap with each other.

Specifically, the above-described change start timing determination unit 140, for example, executes control such that release of the clutches 36, 54 is started at the timing at which the inertia phase of the automatic transmission 16 is started. Even when controlled as described above, because the clutches 36, 54 are released during the inertia phase of the automatic transmission 16, a feeling of strangeness experienced by the driver is suppressed during release of the clutches 36, 54. The cancellation operation of the second snow mode is an example of the predetermined operation related to engagement or release of the disconnect mechanism according to the invention.

When the C/C switch 104 (cruise control switch) for activating the cruise control system is operated to turn on while the vehicle is traveling in the 2WD mode or in the 4WD mode, the drive change determination unit 138 determines to change into the 2WD-d mode by releasing the clutches 36, 54. When the C/C switch 104 is operated to turn on, it is estimated that the vehicle is in a safety traveling state even in the 2WD-d mode.

When the C/C switch 104 is operated to turn on, that is, when the change operation into the cruise control system is carried out, the cruise control system is activated, and the shift control unit 132 executes shift control over the automatic transmission 16 as needed in order to keep the vehicle speed V constant or keep the inter-vehicle distance L to the preceding vehicle constant. For example, at the time of decelerating the vehicle, the automatic transmission 16 is downshifted in order to make engine brake effective. Thus, when the C/C switch 104 is operated to turn on while the vehicle is traveling in the 2WD mode or in the 4WD mode, it is determined to release the clutches 36, 54, and the automatic transmission 16 is shifted as needed. That is, the change operation into the cruise control system is in common with the shift operation of the automatic transmission 16 and the operation to release the clutches 36, 54. At this time, at least one of the automatic transmission 16 or the pair of clutches 36, 54 is controlled such that the shift period of the automatic transmission 16 and the change period into the 2WD-d mode (the release period of the clutches 36, 54) at least partially overlap with each other.

Specifically, when it is determined to shift the automatic transmission 16, the change start timing determination unit 140 is activated, a command to shift the automatic transmission 16 is output, and, in addition, release of the clutches 36, 54 is delayed until a predetermined time t1 elapses from the output of the shift command. When the change start timing determination unit 140 determines that the predetermined time t1 has elapsed from the output of the shift command, the drive change control unit 134 is activated, and release of the clutches 36, 54 is started. At this time, the clutches 36, 54 are released during the inertia phase of the automatic transmission 16, a feeling of strangeness experienced by the driver is suppressed during release of the clutches 36, 54. The change operation into the cruise control system is an example of the predetermined operation related to engagement or release of the disconnect mechanism according to the invention.

When the drive change determination unit 138 detects an operation to turn off the C/C switch 104, that is, the cancellation operation to cancel the cruise control system, while the vehicle is traveling in the 2WD-d mode based on the situation that the cruise control system is active, the drive change determination unit 138 determines to change into the 2WD mode or the 4WD mode. At this time, when it is further determined to shift the automatic transmission 16 based on the automatic shift condition, at least one of the automatic transmission 16 or the pair of clutches 36, 54 is controlled such that the shift period of the automatic transmission 16 and the change period into the 2WD mode or the 4WD mode (the engagement period of the clutches 36, 54) at least partially overlap with each other.

Specifically, the above-described change start timing determination unit 140, for example, executes control such that engagement of the clutches 36, 54 is started at the timing at which the inertia phase of the automatic transmission 16 is started. Even when controlled as described above, because the clutches 36, 54 are engaged during the inertia phase of the automatic transmission 16, a feeling of strangeness experienced by the driver is suppressed during engagement of the clutches 36, 54. The cancellation operation of the cruise control system is an example of the predetermined operation related to engagement or release of the disconnect mechanism according to the invention.

When the drive change determination unit 138 detects the change operation into the eco-mode as a result of an operation of the eco-mode switch 110 while the vehicle is traveling in the 2WD mode or in the 4WD mode, the drive change determination unit 138 determines to change into the 2WD-d mode. In the eco-mode, the electronic throttle valve opening degree θth for the accelerator operation amount Acc is changed toward a fuel economy-oriented side. When the eco-mode is selected, the driver desires traveling by giving a higher priority to fuel economy than running performance, so the 2WD-d mode in which fuel economy improves is desirable. When changed into the eco-mode, it is determined to change from the 2WD mode or the 4WD mode to the 2WD-d mode. However, at this time, when it is further determined to shift the automatic transmission 16 on the basis of the automatic shift condition, at least one of the automatic transmission 16 or the pair of clutches 36, 54 is controlled such that the shift period of the automatic transmission 16 and the change period into the 2WD-d mode (the release period of the clutches 36, 54) at least partially overlap with each other.

Specifically, the above-described change start timing determination unit 140, for example, executes control such that release of the clutches 36, 54 is started at the timing at which the inertia phase of the automatic transmission 16 is started. Even when controlled as described above, because the clutches 36, 54 are released during the inertia phase of the automatic transmission 16, a feeling of strangeness experienced by the driver is suppressed during release of the clutches 36, 54. This change operation into the eco-mode is an example of the operation related to a shift by the driver and the predetermined operation related to engagement or release of the disconnect mechanism according to the invention.

When the drive change determination unit 138 detects an operation to turn off the eco-mode switch 110, that is, the cancellation operation to cancel the eco-mode, while the vehicle is traveling in the 2WD-d mode based on the situation that the eco-mode is active, the drive change determination unit 138 determines to change into the 2WD mode or the 4WD mode. When the eco-mode is cancelled, the driver gives a higher priority to running performance than fuel economy, and this is because it is preferable to change into the 4WD mode in which running performance improves. Thus, it is determined to change from the 2WD-d mode to the 2WD mode or the 4WD mode as a result of a cancellation of the eco-mode. At this time, it is further determined to shift the automatic transmission 16 on the basis of the automatic shift condition, at least one of the automatic transmission 16 or the pair of clutches 36, 54 is controlled such that the shift period of the automatic transmission 16 and the change period into the 2WD mode or the 4WD mode (the engagement period of the clutches 36, 54) at least partially overlap with each other.

Specifically, the above-described change start timing determination unit 140, for example, executes control such that engagement of the clutches 36, 54 is started at the timing at which the inertia phase of the automatic transmission 16 is started. Even when controlled as described above, because the clutches 36, 54 are engaged during the inertia phase of the automatic transmission 16, a feeling of strangeness experienced by the driver is suppressed during engagement of the clutches 36, 54. The cancellation operation of the eco-mode is an example of the predetermined operation related to engagement or release of the disconnect mechanism according to the invention.

For example, even when changed into the sequential shift and then an upshift command is output, but when the automatic transmission 16 is already in the highest speed stage, it is difficult to shift the automatic transmission 16. Even when changed into the first snow mode, but the automatic transmission 16 is set in a speed stage other than the predetermined speed stage into which a shift is restricted, it is difficult to shift the automatic transmission 16. In such a case, a shift of the automatic transmission 16 is not started, so the start of engagement of the clutches 36, 54 may be set in a standby state by the change start timing determination unit 140. However, for example, when the vehicle has slipped, it is required to quickly engage the clutches 36, 54 without waiting for a command to shift the automatic transmission 16. Therefore, when a predetermined condition is satisfied while the vehicle is traveling, the drive change determination unit 138 determines to start engagement of the clutches 36, 54 without waiting for a command to shift the automatic transmission 16. The predetermined condition is the case where immediate engagement of the clutches 36, 54 is required, for example, an immediate change into the 4WD mode is required, such as when a slip of the vehicle is determined based on the fact that the rotational speed difference between the front and rear wheels exceeds a predetermined value.

For example, even when the cruise control system is not active while the vehicle is traveling in the 2WD mode or even when the eco-mode is not selected, it is desirable to change into the 2WD-d mode in response to a request for fuel economy, for example, while the vehicle is traveling on a flat straight road. Therefore, when a predetermined condition set in advance is satisfied while the vehicle is traveling in the 2WD mode or in the 4WD mode, the drive change determination unit 138 permits the start of release of the clutches 36, 54 without waiting for a command to shift the automatic transmission 16. That is, irrespective of a command to shift the automatic transmission 16, it is determined to release the clutches 36, 54. The predetermined condition corresponds to the case where the traveling state of the vehicle is stable. For example, when it is determined that the vehicle is in a steady traveling state on the basis of the vehicle speed V, accelerator operation amount Acc, steering angle θ, and the like, of the vehicle and then the predetermined time set in advance has elapsed in this state, it is determined that the predetermined condition is satisfied.

Figure 3:
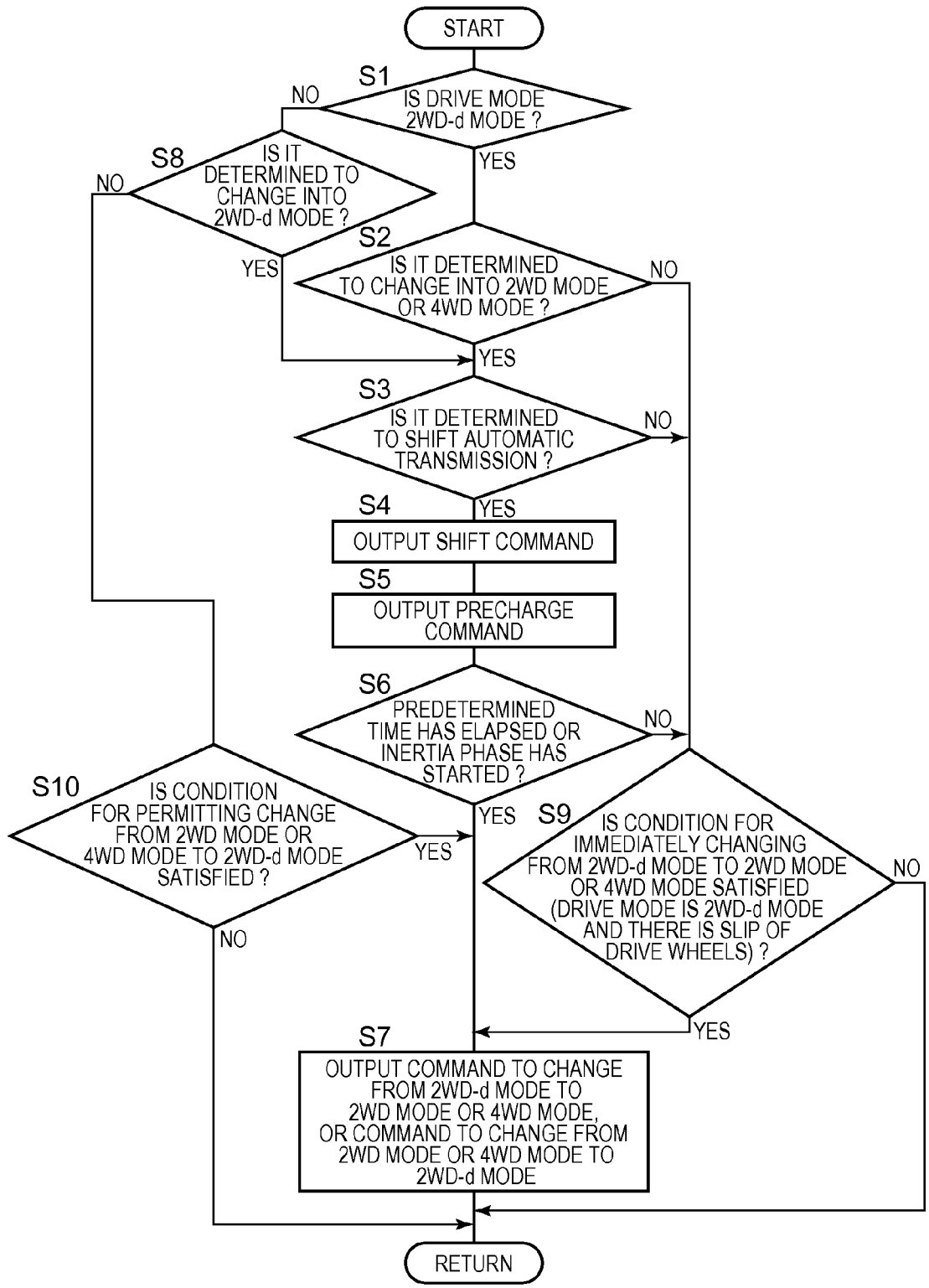
FIG. 3 is a flowchart for illustrating a relevant portion of control operations of the electronic control unit shown in FIG. 2, that is, control operations for suppressing a feeling of strangeness experienced by a driver during a change of a drive mode between a 2WD-d mode (described later) and a 2WD mode or a 4WD mode at the time of changing the drive mode as needed while the vehicle is traveling.

FIG. 3 is a flowchart for illustrating a relevant portion of control operations of the electronic control unit 80, that is, control operations for suppressing a feeling of strangeness experienced by the driver during a change of the drive mode between the 2WD-d mode and the 2WD mode or the 4WD mode at the time of changing the drive mode as needed while the vehicle is traveling. This flowchart is repeatedly executed at an extremely short cycle time of about several milliseconds to several tens of milliseconds.

Initially, in step S (hereinafter, step is omitted) corresponding to the drive mode determination unit 136, it is determined whether the current drive mode is the 2WD-d mode. When negative determination is made in S1, the process proceeds to S8 (described later). When affirmative determination is made in S1, it is determined in S2 corresponding to the drive change determination unit 138 whether to change from the 2WD-d mode to the 2WD mode or the 4WD mode. For example, when the change operation to change the shift lever to the M position corresponding to the sequential shift and the shift operation from the M position have been detected, when the shift operation resulting from an operation of the paddle shift switch 106 has been detected, when the change operation into the first snow mode or the second snow mode has been detected, when the change operation into the sport mode has been detected, when the cancellation operation of the cruise control system has been detected, or when the cancellation operation of the eco-mode has been detected, it is determined to change from the 2WD-d mode to the 2WD mode or the 4WD mode. When negative determination is made in S2, the process proceeds to S9 (described later). When affirmative determination is made in S2, the process proceeds to S3 corresponding to the shift control unit 132.

When negative determination is made in S1, it is determined in S8 corresponding to the drive change determination unit 138 whether to change from the 2WD mode or the 4WD mode to the 2WD-d mode. For example, when the operation to activate the cruise control system has been detected, when the cancellation operation of the first snow mode or the second snow mode has been detected, when the cancellation operation of the sport mode has been detected, or when the change operation into the eco-mode has been detected, it is determined to change from the 2WD mode or the 4WD mode to the 2WD-d mode. When negative determination is made in S8, the process proceeds to S10. When affirmative determination is made in S8, the process proceeds to S3 corresponding to the shift control unit 132.

In S3 corresponding to the shift control unit 132, it is determined whether to shift the automatic transmission 16 on the basis of, for example, whether the traveling state of the vehicle has crossed any one of the shift lines prescribed in the shift map, whether the paddle shift switch 106 or the shift lever is operated to shift toward an upshift side or a downshift side, whether shift determination is carried out in association with a change into the sport mode or whether shift determination is carried out in association with a change into the first snow mode.

When negative determination is made in S3, the process proceeds to S9 (described later). When affirmative determination is made in S3, a command to shift the automatic transmission 16 is output and the shift is started in S4 corresponding to the shift control unit 132. Subsequently, in S5 corresponding to the drive change control unit 134, at the time of engaging the clutches 36, 54, a precharge command is output to control the coupling 22 to a state just before engagement, and the coupling 22 is controlled to a state just before engagement. When the clutches 36, 54 are released, this precharge command is not output. In S6 corresponding to the change start timing determination unit 140, the engagement-release start timing of the clutches 36, 54 is determined on the basis of whether the predetermined time t1 set in advance has elapsed from when the command to shift the automatic transmission 16 is output or whether the start of the inertia phase has been detected. When negative determination is made in S6, the process proceeds to S9 (described later). When affirmative determination is made in S6, a command to change the engaged or released state of each of the clutches 36, 54 is output and the engaged or released state of each of the clutches 36, 54 is changed in S7 corresponding to the drive change control unit 134.

When negative determination is made in S2, when negative determination is made in S3 or when negative determination is made in S6, the process proceeds to S9 corresponding to the drive change determination unit 138. In S9, it is determined whether the predetermined condition, such as occurrence of a slip, is satisfied while the vehicle is traveling in the 2WD-d mode. When the predetermined condition is satisfied, the drive mode is immediately changed from the 2WD-d mode to the 2WD mode or the 4WD mode. When affirmative determination is made in S9, engagement of the clutches S7 is started in S7 without waiting for a command to shift the automatic transmission 16. When negative determination is made in S9, the process returns to S1, and the above-described steps are repeatedly executed.

The process returns to S8, and, when negative determination is made in S8, it is determined in S10 corresponding to the drive change determination unit 138 whether the predetermined condition, such as a request for fuel economy, is satisfied. When the predetermined condition is satisfied, the drive mode is changed from the 2WD mode or the 4WD mode to the 2WD-d mode. When affirmative determination is made in S10, a change command for releasing the clutches 36, 54 is output and the clutches 36, 54 are released in S7 without waiting for a command to shift the automatic transmission 16. When negative determination is made in S10, the process returns to S1, and the above-described steps are repeatedly executed.

Figure 4:
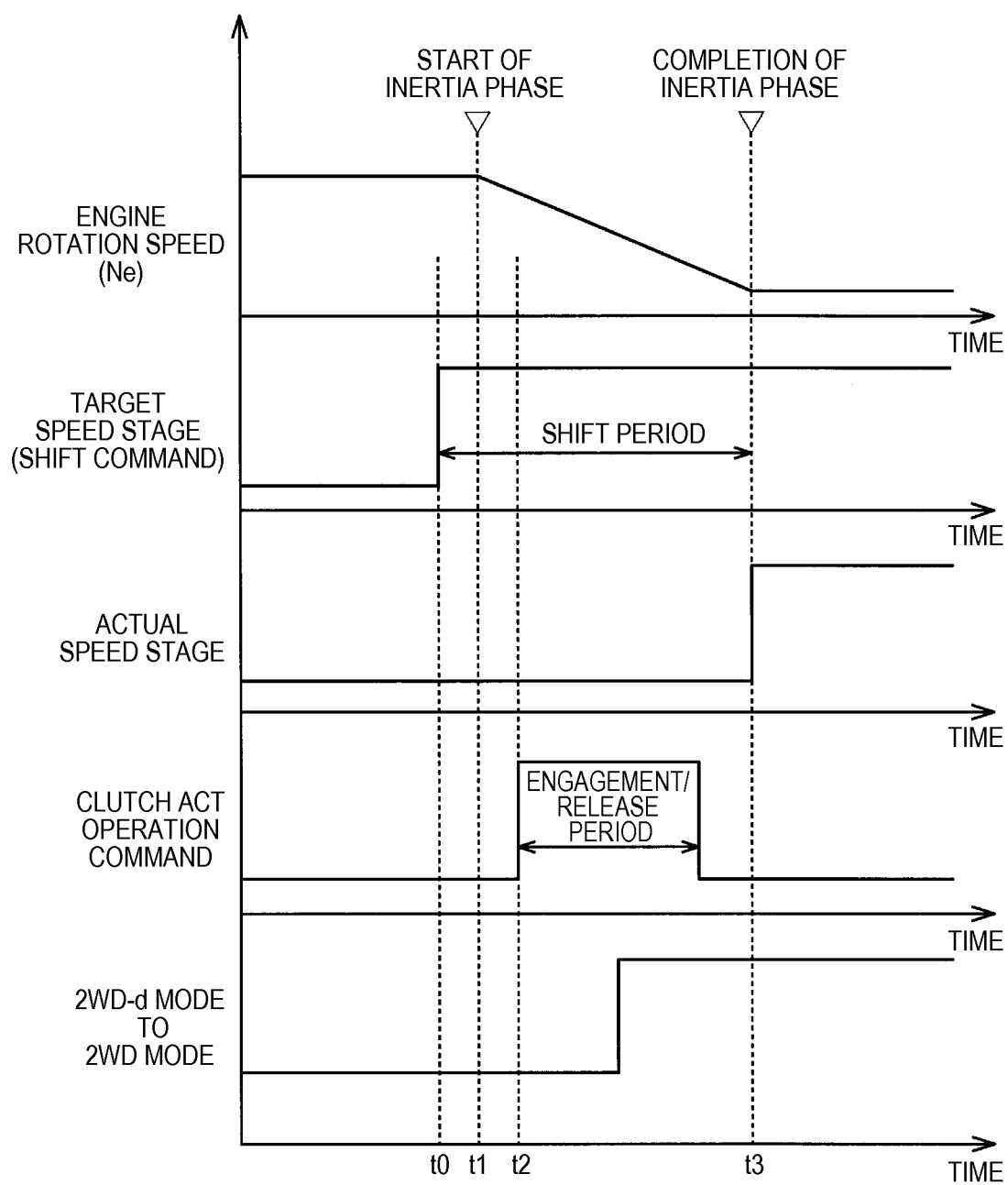
FIG. 4 is a time chart that shows one example of the result of operation that is executed on the basis of the flowchart shown in FIG. 3.

FIG. 4 is a time chart that shows one example of the result of an operation that is executed on the basis of the flowchart shown in FIG. 3, and shows the result of an operation, for example, at the time when shifted into a selected speed stage as a result of an operation of the paddle shift switch 106 while the vehicle is traveling in the 2WD-d mode.

When the paddle shift switch 106 is operated by the driver and a command to shift into the predetermined speed stage is output at t0 timing, the inertia phase is started at t1 timing. Because the paddle shift switch 106 is operated, it is also determined to change from the 2WD-d mode to the 2WD mode; however, engagement of the clutches 36, 54 is not stated at this timing (t0 timing). A command to change from the 2WD-d mode to the 2WD mode is output at t2 timing at which a predetermined time has elapsed from t0 timing, and the operation of the actuators 46, 64 that respectively engage the clutches 36, 54 is started. At this time, because the automatic transmission 16 is in the inertia phase, the engagement period of the clutches 36, 54 and the shift period of the automatic transmission 16 overlap with each other. The shift completes when the inertia phase completes at t3 timing. Because engagement of the clutches 36, 54 completes during the initial phase, a feeling of strangeness due to an increase in rotational inertia that arises as a result of engagement of the clutches 36, 54 disappears in a change in driving force during the inertia phase, a feeling of strangeness experienced in the case where the clutches 36, 54 are engaged separately is suppressed.

As described above, according to the present embodiment, because the shift period based on the shift condition of the automatic transmission 16 and the engagement-release period based on the predetermined operation of each of the clutches 36, 54 at least partially overlap with each other, each of the clutches 36, 54 is at least partially engaged or released while the automatic transmission 16 is being shifted. Thus, it is possible to suppress a feeling of strangeness experienced by the driver in the case where each of the clutches 36, 54 are engaged or released separately. That is, by causing a shift of the automatic transmission 16 and engagement or release of the clutches 36, 54 to overlap with each other, it is possible to cause a feeling of strangeness experienced by the driver due to a change in rotational inertia during engagement or release of the clutches 36, 54 to disappear in a change in driving force due to a shift of the automatic transmission 16. Thus, it is possible to suppress a feeling of strangeness experienced by the driver in the case where the clutches 36, 54 are engaged or released separately. In other words, a feeling of strangeness experienced by the driver during engagement or release of the clutches 36, 54 disappears in a feeling of strangeness experienced by the driver during a shift of the automatic transmission 16. Thus, it is possible to suppress a feeling of strangeness experienced by the driver in the case where the clutches 36, 54 are engaged or released separately. Because a shift of the automatic transmission 16 is based on the shift condition of the automatic transmission 16, a shift is not carried out to engage or release the clutches 36, 54, and a feeling of strangeness experienced by the driver as a result of an unnecessary shift is also prevented.

According to the present embodiment, the operation related to a shift by the driver is in common with the predetermined operation related to engagement or release of the clutches 36, 54. Thus, when the operation related to a shift is carried out, the operation related to engagement or release of the clutches 36, 54 is also carried out. When the automatic transmission 16 is shifted and the clutches 36, 54 are engaged or released on the basis of the common operation, the shift period of the automatic transmission 16 and the engagement-release period of the clutches 36, 54 are caused to overlap with each other. Thus, it is possible to suppress a feeling of strangeness experienced by the driver when the clutches 36, 54 are engaged separately.

According to the present embodiment, while the vehicle is traveling in the 2WD-d mode, when any one of the change operation into the sequential shift, the shift operation by the sequential shift, the change operation into the sport mode, the change operation into the first snow mode or the second snow mode, the cancellation operation of the eco-mode and the cancellation operation of the cruise control system is carried out, it is determined to change into the 2WD mode or the 4WD mode. By controlling the clutches 36, 54 such that the shift period of the automatic transmission 16 and the change period into the 2WD mode or the 4WD mode overlap with each other, it is possible to suppress a feeling of strangeness experienced by the driver in the case where the drive mode is changed into the 2WD mode or the 4WD mode separately.

According to the present embodiment, while the vehicle is traveling in the 2WD mode or in the 4WD mode, when any one of the change operation into the eco-mode, the cancellation operation of the first snow mode or the second snow mode, the change operation to activate the cruise control system and the cancellation operation of the sport mode is carried out, it is determined to change into the 2WD-d mode. The clutches 36, 54 are controlled such that the shift period of the automatic transmission 16 overlaps with the change period into the 2WD-d mode. Thus, it is possible to suppress a feeling of strangeness experienced by the driver in the case where the drive mode is changed into the 2WD-d mode separately.

According to the present embodiment, the clutches 36, 54 are engaged or released during the inertia phase corresponding to a substantial shift of the automatic transmission 16. Thus, a feeling of strangeness experienced due to a change in rotational inertia resulting from engagement or release of the clutches 36, 54 disappears in a change in the driving force of the automatic transmission 16, so it is possible to effectively suppress a feeling of strangeness experienced by the driver in the case where the clutches 36, 54 are engaged or released separately.

According to the present embodiment, when the predetermined condition for quickly engaging or releasing the clutches 36, 54, such as when there occurs a slip of the vehicle, is satisfied, it is preferable to engage or release the clutches 36, 54 without waiting for a command to shift the automatic transmission 16. In such a case, by starting engagement or release of the clutches 36, 54 on the basis of the fact that the predetermined condition is satisfied, it is possible to quickly engage or release the clutches 36, 54.

Next, another embodiment of the invention will be described. In the following description, like reference numerals denote portions common to the above-described embodiment, and the description thereof is omitted.

Figure 5:
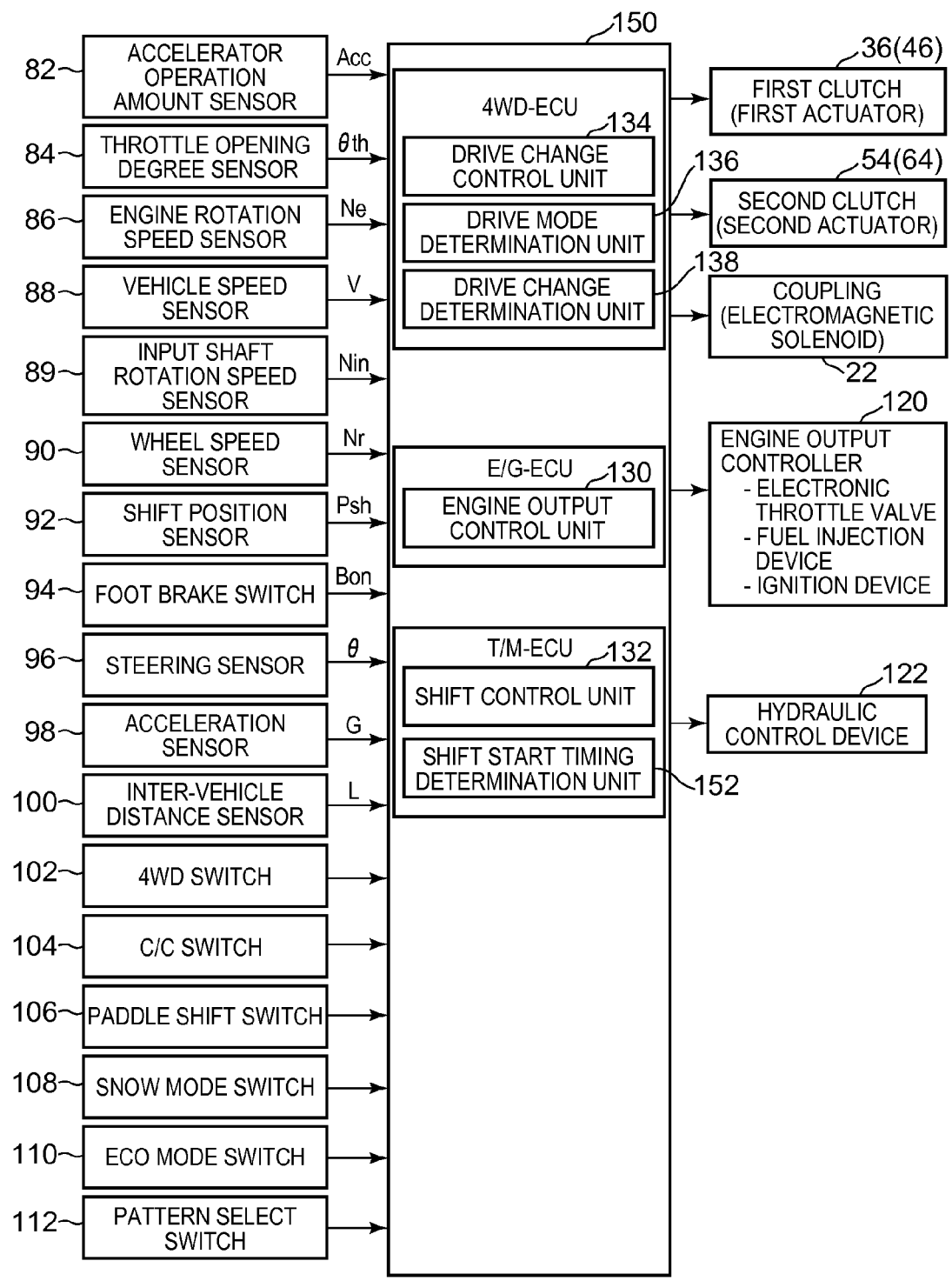
FIG. 5 is a functional block diagram that illustrates a control system of an electronic control unit corresponding to another embodiment of the invention and that illustrates a relevant portion of control functions associated with a change of a front/rear wheel driving state.

A second embodiment of the invention will be described. In the above-described embodiment, until the inertia phase of the automatic transmission 16 is started, engagement or release (change) of the clutches 36, 54 are delayed. In the present embodiment, a shift of the automatic transmission 16 is started during engagement or release of the clutches 36, 54. That is, output of a command to shift the automatic transmission 16 is delayed. FIG. 5 is a functional block diagram that illustrates a relevant portion of control functions of an electronic control unit 150 according to the present embodiment. The electronic control unit 150 shown in FIG. 5 differs from the electronic control unit 80 according to the above-described embodiment in that the change start timing determination unit 140 of the 4WD-ECU is omitted and a shift start timing determination unit 152 is added to the T/M-ECU. Hereinafter, the newly added shift start timing determination unit 152 will be mainly described, and the description of the components common to the above-described embodiment is omitted.

After output of a command to engage or release the clutches 36, 54, the shift start timing determination unit 152 determines whether to output a shift command on the basis of whether a predetermined time t2 has elapsed. That is, the shift start timing determination unit 152 delays a shift by the predetermined time t2 with respect to a command to engage or release the clutches 36, 54. The predetermined time t2 is empirically obtained in advance, and is set to a value such that engagement of the clutches 36, 54 completes during the inertia phase of the automatic transmission 16. The engagement-release period of the clutches 36, 54 also includes a period during which the coupling 22 is engaged or released. Particularly, at a low temperature, it takes time until engagement of the clutches 36, 54 completes. Thus, engagement of each of the clutches 36, 54 may not complete during the inertia phase of the automatic transmission 16. In such a case, a delay time that is the predetermined time t2 between output of a command to engage or release the clutches 36, 54 to output of a command to shift the automatic transmission 16 is set. Thus, it is possible to suppress a feeling of strangeness experienced by the driver during engagement or release of the clutches 36, 54 by completing engagement or release of the clutches 36, 54 in a period until the inertia phase of the automatic transmission 16 completes. The predetermined time t2 may be changed as needed on the basis of, for example, an ambient temperature, or the like.

Figure 6:
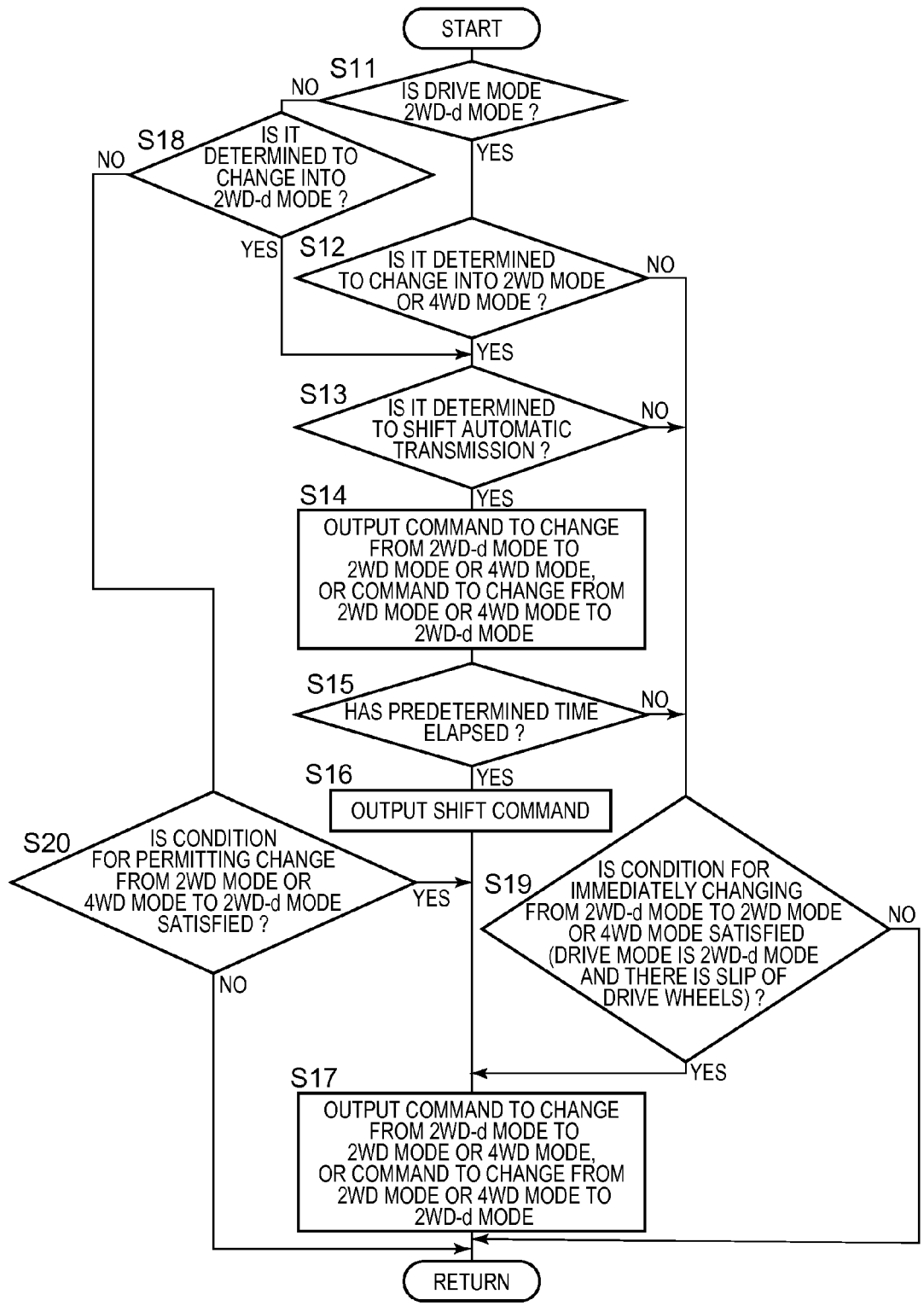
FIG. 6 is a flowchart for illustrating a relevant portion of control operations of the electronic control unit shown in FIG. 5, that is, control operations for suppressing a feeling of strangeness experienced by a driver during a change of the drive mode between the 2WD-d mode and the 2WD mode or the 4WD mode at the time of changing the drive mode as needed while the vehicle is traveling.

FIG. 6 is a flowchart for illustrating a relevant portion of control operations of the electronic control unit 150, that is, control operations for suppressing a feeling of strangeness experienced by a driver during a change of the drive mode between the 2WD-d mode and the 2WD mode or the 4WD mode at the time of changing the drive mode as needed while the vehicle is traveling. This flowchart is repeatedly executed at an extremely short cycle time of about several milliseconds to several tens of milliseconds.

Initially, in step S11 corresponding to the drive mode determination unit 136, it is determined whether the current drive mode is the 2WD-d mode. When negative determination is made in S11, the process proceeds to S18. When affirmative determination is made in S11, it is determined in S12 corresponding to the drive change determination unit 138 whether to change from the 2WD-d mode to the 2WD mode or the 4WD mode. A specific manner of determination of S12 is similar to that of step S2 shown in FIG. 3, so the description is omitted. When negative determination is made in S12, the process proceeds to S19. When affirmative determination is made in S12, the process proceeds to S13 corresponding to the shift control unit 132.

When negative determination is made in S11, it is determined in S18 corresponding to the drive change determination unit 138 whether to change from the 2WD mode or the 4WD mode to the 2WD-d mode. A specific manner of determination of S18 is similar to that of step S8 shown in FIG. 3, so the description thereof is omitted. When negative determination is made in S18, the process proceeds to S20. When affirmative determination is made in S18, the process proceeds to S13. In S13 corresponding to the shift control unit 132, it is determined whether to shift the automatic transmission 16 on the basis of whether the traveling state of the vehicle has crossed any one of the shift lines prescribed in the shift map, whether the paddle shift switch 106 or the shift lever is operated to shift toward an upshift side or a downshift side, whether shift determination is carried out in association with a change into the sport mode or whether shift determination is carried out in association with a change into the first snow mode.

When negative determination is made in S13, the process proceeds to S19. When affirmative determination is made in S13, a command to change the drive mode, that is, a command to engage or release the clutches 36, 54, is output and engagement or release of the clutches 36, 54 is started in S14 corresponding to drive change control unit 134. Subsequently, in S15 corresponding to the shift start timing determination unit 152, it is determined whether the predetermined time t2 has elapsed from output of the command to engage or release the clutches 36, 54. When negative determination is made in S15, the process proceeds to S19. When affirmative determination is made in S15, a command to shift the automatic transmission 16 is output and the shift is started in S16 corresponding to the shift control unit 132. In S17 corresponding to the drive change control unit 134, a command to change the drive mode is output. When the change command has been already output, this step is not executed.

When negative determination is made in S12, when negative determination is made in S13 or when negative determination is made in S15, the process proceeds to S19 corresponding to the drive change determination unit 138. In S19, it is determined whether the predetermined condition, such as occurrence of a slip, is satisfied while the vehicle is traveling in the 2WD-d mode. When the predetermined condition is satisfied, the drive mode is changed from the 2WD-d mode to the 2WD mode or the 4WD mode. When affirmative determination is made in S19, engagement of the clutches 36, 54 is immediately started in S17. When negative determination is made in S19, the process returns to S11, and the above-described steps are repeatedly executed.

The process returns to S18, and, when negative determination is made in S18, it is determined in S20 corresponding to the drive change determination unit 138 whether the predetermined condition, such as a request for fuel economy, is satisfied. When the predetermined condition is satisfied, the drive mode is changed from the 2WD mode or the 4WD mode to the 2WD-d mode. When affirmative determination is made in S20, the clutches 36, 54 are released in S17. When negative determination is made in S20, the process returns to S11, and the above-described steps are repeatedly executed.

As described above, similar advantageous effects to those of the above-described embodiment are obtained from the present embodiment. As in the case of the present embodiment, by delaying output of a command to shift the automatic transmission 16 with respect to a command to engage or release the clutches 36, 54, it is possible to complete engagement or release of the clutches 36, 54 during a shift of the automatic transmission 16. Thus, a feeling of strangeness experienced due to a change in rotational inertia resulting from engagement or release of the clutches 36, 54 disappears in a change in the driving force of the automatic transmission 16, so it is possible to suppress a feeling of strangeness experienced by the driver in the case where the clutches 36, 54 are engaged or released separately.

A third embodiment of the invention will be described. In the present embodiment, when it is determined to change the drive mode on the basis of an operation of the 4WD switch 102 and it is determined to shift the automatic transmission 16 on the basis of an automatic shift condition that is prescribed based on a vehicle traveling state thereafter, at least one of the automatic transmission 16 or the pair of clutches 36, 54 is controlled such that the engagement-release period of the clutches 36, 54 and the shift period of the automatic transmission 16 at least partially overlap with each other.

Figure 7:
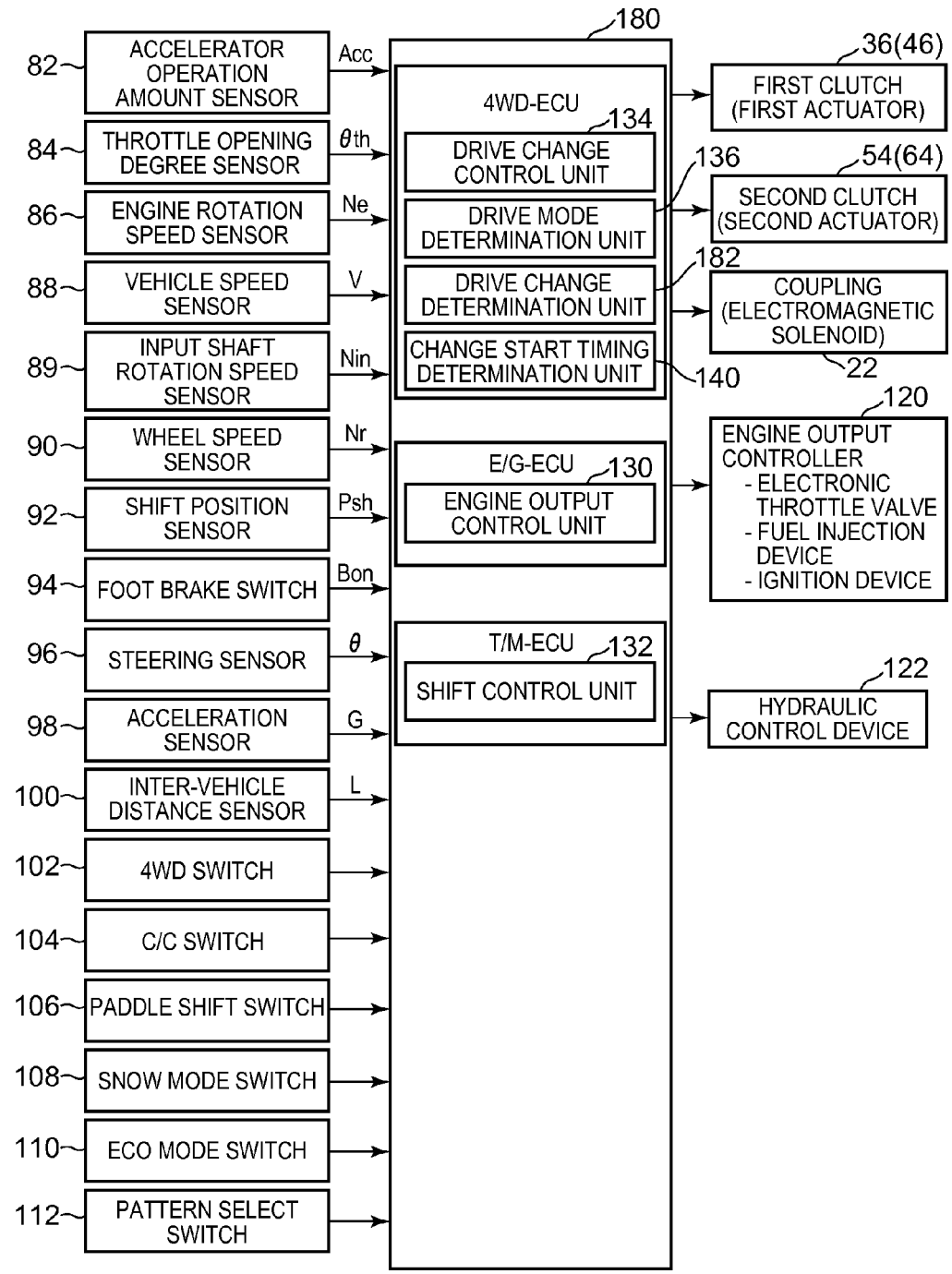
FIG. 7 is a functional block diagram that illustrates a control system of an electronic control unit corresponding to further another embodiment of the invention and that illustrates a relevant portion of control functions associated with a change of a front/rear wheel driving state.

FIG. 7 is a functional block diagram that illustrates a control system of an electronic control unit 180 corresponding to further another embodiment of the invention and a relevant portion of control functions associated with a change of the front/rear wheel driving state. The electronic control unit 180 shown in FIG. 7 differs from the electronic control unit 80 according to the above-described embodiment in that a specific function of a drive change determination unit 182 is different, and the other control functions are the same. Hereinafter, the drive change determination unit 182 will be mainly described, and the description of the components common to the above-described embodiment is omitted.

The drive change determination unit 182 shown in FIG. 7 determines whether the 4WD switch 102 is operated to change to the four-wheel drive mode side while the vehicle is traveling in the 2WD-d mode. When the 4WD switch 102 is operated to change to the four-wheel drive mode side while the vehicle is traveling in the 2WD-d mode, it is determined to change into the 4WD mode, that is, to engage the clutches 36, 54. The drive change determination unit 182 determines whether the 4WD switch 102 is operated to change to the two-wheel drive mode side while the vehicle is traveling in the 2WD mode or in the 4WD mode. When the 4WD switch 102 is operated to change to the two-wheel drive mode side while the vehicle is traveling in the 2WD mode or in the 4WD mode, it is determined to change into the 2WD-d mode, that is, to release the clutches 36, 54. The change operation of the 4WD switch 102 is an example of the predetermined operation related to engagement or release of the disconnect mechanism.

When it is determined to change the engaged or released state of each of the clutches 36, 54 on the basis of the 4WD switch 102, the change start timing determination unit 140 is activated. The change start timing determination unit 140 determines the timing at which engagement or release of the clutches 36, 54 is started. When it is determined to change the engaged or released state of each of the clutches 36, 54, the change start timing determination unit 140 detects a command to shift the automatic transmission 16, and determines the change start timing of the clutches 36, 54 based on whether the predetermined time t1 has elapsed after the command to shift the automatic transmission 16 is output or whether the inertia phase of the automatic transmission 16 is started. A shift after it is determined to change the engaged or released state of each of the clutches 36, 54 is usually an automatic shift based the shift map. Thus, after it is determined to engage or release the clutches 36, 54, when it is determined to shift the automatic transmission 16 and a shift command is output because of fulfillment of the automatic shift condition (specifically, the automatic shift condition based on the shift map) that is prescribed based on an actual traveling state of the vehicle, engagement or release of the clutches 36, 54 is delayed until the predetermined time elapses. When the inertia phase of the automatic transmission 16 is started, engagement or release of the clutches 36, 54 is started. Thus, a change in rotational inertia resulting from engagement or release of the clutches 36, 54 disappears in a change in driving force during the inertia phase of the automatic transmission 16, so a feeling of strangeness experienced by the driver is suppressed during engagement or release of the clutches 36, 54.

Even when it is determined to engage or release the clutches 36, 54 on the basis of the 4WD switch 102, but when the traveling state of the vehicle is substantially steady, it is not determined to shift the automatic transmission 16, and it takes time until the start of the shift. However, for example, when there occurs a slip while the vehicle is traveling in the 2WD-d mode, it is required to quickly change into the 4WD mode. Therefore, for example, when the drive change determination unit 138 detects occurrence of a slip on the basis of the fact that the rotational speed difference between the front and rear wheels exceeds a predetermined value while the vehicle is traveling in the 2WD-d mode, the drive change determination unit 138 determines to engage the clutches 36, 54 without waiting for a command to shift the automatic transmission 16. In this way, when the predetermined condition, such as occurrence of a slip in the vehicle, is satisfied, engagement of each of the clutches 36, 54 is started irrespective of a command to shift the automatic transmission 16.

While the vehicle is traveling in the 2WD mode or in the 4WD mode, even when no change command based on the 4WD switch 102 is output, it is desirable to change into the 2WD-d mode in response to a request for fuel economy, for example, while the vehicle is traveling on a flat straight road. Therefore, when a predetermined condition set in advance is satisfied while the vehicle is traveling in the 2WD mode or in the 4WD mode, the drive change determination unit 138 permits release of the clutches 36, 54 irrespective of whether there is a command to shift the automatic transmission 16. The predetermined condition corresponds to the case where it is preferable to give a higher priority to fuel economy than suppressing a feeling of strangeness experienced by the driver during release of the clutches 36, 54. It is determined that the predetermined condition is satisfied, for example, when it is determined that the vehicle is in a steady traveling state on the basis of the vehicle speed V, accelerator operation amount Acc, steering angle θ, and the like, of the vehicle and then a predetermined time set in advance has elapsed in this state.

FIG. 8 is a flowchart for illustrating a relevant portion of control operations of the electronic control unit 180, that is, control operations for suppressing a feeling of strangeness experienced by the driver during a change of the drive mode between the 2WD-d mode and the 2WD mode or the 4WD mode at the time of changing the drive mode as needed while the vehicle is traveling. This flowchart is repeatedly executed at an extremely short cycle time of about several milliseconds to several tens of milliseconds.

Initially, in step S21 corresponding to the drive mode determination unit 136, it is determined whether the current drive mode is the 2WD-d mode. When affirmative determination is made in S21, it is determined in S22 corresponding to the drive change determination unit 138 whether the 4WD switch 102 is operated to change to the four-wheel drive mode side. When affirmative determination is made in S22, the process proceeds to S23 corresponding to the shift control unit 132. When negative determination is made in S22, the process proceeds to S29.

When negative determination is made in S21, it is determined in S28 corresponding to the drive change determination unit 138 whether the 4WD switch 102 is operated to change to the two-wheel drive mode side. When affirmative determination is made in S28, the process proceeds to S23. When negative determination is made in S28, the process proceeds to S30.

In S23 corresponding to the shift control unit 132, it is determined whether to automatically shift the automatic transmission 16 on the basis of an actual traveling state by consulting the shift map. When negative determination is made in S23, the process proceeds to S29. When affirmative determination is made in S23, a command to shift the automatic transmission 16 is output and the shift is started in S24 corresponding to the shift control unit 132. Subsequently, in S25 corresponding to the drive change control unit 134, when it is determined to engage the clutches 36, 54, a precharge command is output to control the coupling 22 to a state just before engagement. In S26 corresponding to the change start timing determination unit 140, the engagement-release start timing of the clutches 36, 54 is determined on the basis of whether a predetermined time t set in advance has elapsed from when the command to shift the automatic transmission 16 is output or whether the start of the inertia phase has been detected. When negative determination is made in S26, the process proceeds to S29. When affirmative determination is made in S26, a command to change the engaged or released state of each of the clutches 36, 54 is output and the engaged or released state of each of the clutches 36, 54 is changed in S27 corresponding to the drive change control unit 134.

When negative determination is made in S22, when negative determination is made in S23 or when negative determination is made in S26, and while the vehicle is traveling in the 2WD-d mode, it is determined in S29 corresponding to the drive change determination unit 138 whether the predetermined condition for changing from the 2WD-d mode to the 2WD mode or the 4WD mode is satisfied. When affirmative determination is made in S29, a change command for engaging the clutches 36, 54 is output in S27 without waiting for a command to shift the automatic transmission 16. When negative determination is made in S29, the process returns to S21, and the above-described steps are repeatedly executed.

The process returns to S28, and when negative determination is made in S28, it is determined in S30 corresponding to the drive change determination unit 138 whether the predetermined condition for changing from the 2WD mode or the 4WD mode to the 2WD-d mode is satisfied. When affirmative determination is made in S30, a change command for releasing the clutches 36, 54 is output and the clutches 36, 54 are released in S27 without waiting for a command to shift the automatic transmission 16. When negative determination is made in S30, the process returns to S21, and the above-described steps are repeatedly executed.

As described above, similar advantageous effects to those of the above-described embodiments are obtained from the present embodiment. When the 4WD switch 102 is operated to change to the four-wheel drive mode side while the vehicle is traveling in the 2WD-d mode, that is, in a state where the clutches 36, 54 are released, it is determined to change into the 4WD mode, that is, to engage the clutches 36, 54, and it is determined to automatically shift the automatic transmission 16 when the automatic shift condition is satisfied after the change operation. By controlling the clutches 36, 54 such that the shift period of the automatic transmission 16 and the change period into the 4WD mode (the engagement period of the clutches 36, 54) overlap with each other, it is possible to suppress a feeling of strangeness experienced by the driver in the case where the drive mode is changed into the 4WD mode separately.

When the 4WD switch 102 is operated to change to the two-wheel drive mode side while the vehicle is traveling in a state where the clutches 36, 54 are engaged, it is determined to change into the 2WD-d mode (release the clutches 36, 54), and it is determined to automatically shift the automatic transmission 16 when the automatic shift condition is satisfied after the change operation. By controlling the clutches 36, 54 such that the shift period of the automatic transmission 16 and the change period into the 2WD-d mode (the release period of the clutches 36, 54) overlap with each other, it is possible to suppress a feeling of strangeness experienced by the driver in the case where the drive mode is changed into the 2WD-d mode separately.

The embodiments of the invention are described in detail above with reference to the accompanying drawings; however, the invention is also applied to other examples.

For example, the above-described embodiments each are described separately; however, the above-described embodiments may be implemented in combination as needed without contradiction. For example, in addition to the example described in the first embodiment, control for changing the disconnect mechanism based on the 4WD switch 102 according to the third embodiment may be executed. In addition to the example of the second embodiment, control for changing the disconnect mechanism based on the 4WD switch 102 according to the third embodiment may be executed.

A determination to change the drive mode (a determination to engage or release the disconnect mechanism) according to the above-described embodiments does not necessarily include all the examples, and may include at least one of these examples. For example, in the above-described embodiments, two snow modes are set, and it is determined whether to engage or release the disconnect mechanism on the basis of a change of the snow mode; however, only one snow mode may be set.

In the above-described embodiments, the clutches 36, 54 are engaged or released within the shift period of the automatic transmission 16. This is one example, and the shift period of the automatic transmission 16 and the engagement-release period of the clutches 36, 54 just need to at least partially overlap with each other. For example, the automatic transmission 16 may be shifted within the engagement-release period of the clutches 36, 54. Engagement or release of the clutches 36, 54 may be started before a shift of the automatic transmission 16 or a shift of the automatic transmission 16 may be completed earlier than engagement or release of the clutches 36, 54.

In the above-described embodiments, engagement or release of the clutches 36, 54 is started after a lapse of the predetermined time from output of a command to shift the automatic transmission 16, that is, substantially after the start of the inertia phase. However, the start of engagement or release of the clutches 36, 54 is not necessarily limited to the timing after the start of the inertia phase.

In the above-described embodiments, for example, when changed into the first snow mode, the automatic transmission 16 is shifted in association with the fact that a shift into the predetermined speed stage is restricted. The manner in which a shift is determined may be another manner in which, for example, the automatic shift condition based on the shift map of the automatic transmission 16 is satisfied. That is, as long as a shift is based on the shift condition of the automatic transmission 16, the manner of shift determination is not specifically limited.

In the above-described embodiments, when it is determined to change the engaged or released state of each of the clutches 36, 54 on the basis of the 4WD switch 102, the invention is applied usually when it is determined to shift the automatic transmission 16 based on the shift map. However, the invention is not necessarily limited to a shift based on the shift map. After it is determined to engage or release the clutches 36, 54, even when the automatic transmission 16 is shifted on the basis of, for example, the fact that the paddle shift switch 106 is operated, the invention is applicable.

In the above-described embodiments, the pair of first clutch 36 and second clutch 54 is an example of the disconnect mechanism according to the invention. When the first clutch 36 and the coupling 22 are released as well, it is possible to prevent co-rotation of the rotating members (the second rotating member 34, the driven pinion 40, the propeller shaft 20) that constitute the power transmission path between the first clutch 36 and the coupling 22. Thus, instead of the second clutch 54, the coupling 22 may be applied as part of the disconnect mechanism. In this respect, one of the coupling 22 and the second clutch 54 may be omitted.

The four-wheel drive vehicle 8 according to the above-described embodiments is only illustrative, and the invention is not limited to the four-wheel drive vehicle 8. That is, the invention is appropriately applied to a four-wheel drive vehicle as long as the four-wheel drive vehicle includes a disconnect mechanism that prevents co-rotation of a predetermined rotating element, such as a propeller shaft, by interrupting transmission of power to the predetermined rotating element while the vehicle is traveling in the 2WD mode.

In the above-described embodiments, the four-wheel drive vehicle 8 has such a structure that power is constantly transmitted to the front wheel side. The invention is not necessarily limited to a vehicle having such a structure that power is constantly transmitted to the front wheel side, but the invention is also applicable to a vehicle having such a structure that power is constantly transmitted to the rear wheel side and power is selectively transmitted to the front wheel side. A specific structure of the coupling 22 may be modified as needed as long as the coupling 22 is able to control transmitted torque.

In the above-described embodiments, the first clutch 36 and the second clutch 54 corresponding to the disconnect mechanism are dog clutches. The first clutch 36 and the second clutch 54 are not necessarily limited to dog clutches. The first clutch 36 and the second clutch 54 may be modified as needed as long as the first clutch 36 and the second clutch 54 each are able to connect or disconnect rotating elements to or from each other.

In the above-described embodiments, the automatic transmission 16 is a stepped automatic transmission formed of a plurality of planetary gear units and a plurality of friction engagement devices. The structure of the transmission is not necessarily limited to this configuration, and may be, for example, a gear-type transmission. The transmission is not necessarily limited to a stepped transmission, and the structure of the transmission may be changed as needed. The structure of the transmission may be, for example, a belt-type continuously variable transmission.

In the above-described embodiments, the first clutch 36 and the second clutch 54 are dog clutches. The clutches are not limited to this type, and appropriate clutches are applicable as long as the clutches are configured to be able to connect or disconnect rotating elements to or from each other. In the above-described embodiments, the second clutch 54 includes a synchronization mechanism. Instead, the first clutch 36 may include a synchronization mechanism. Each of the first clutch 36 and the second clutch 54 may include a synchronization mechanism.

The above-described embodiments are only illustrative. The invention may be implemented in an example including various modifications or improvements on the basis of the knowledge of persons skilled in the art.

What is claimed is:

1. A control system for a four-wheel drive vehicle, the four-wheel drive vehicle including an engine, main drive wheels to which power is transmitted from the engine while the vehicle is traveling in a two-wheel drive mode or in a four-wheel drive mode, auxiliary drive wheels to which power is transmitted from the engine while the vehicle is traveling in the four-wheel drive mode, an automatic transmission provided in a power transmission path between the engine and the main drive wheels, the automatic transmission provided in a power transmission path between the engine and the auxiliary drive wheels, and a disconnect mechanism provided in a power transmission path between the automatic transmission and the auxiliary drive wheels, the disconnect mechanism being configured to disconnect a predetermined rotating element from the engine and the auxiliary drive wheels while the vehicle is traveling in the two-wheel drive mode, the predetermined rotating element being configured to transmit power to the auxiliary drive wheels while the vehicle is traveling in the four-wheel drive mode,
the control system comprising:
an electronic control unit configured to:
 (a) execute shift control when a shift condition of the automatic transmission is satisfied;
 (b) selectively engage or release the disconnect mechanism based on a traveling state of the vehicle and a driver's predetermined operation; and
 (c) control at least one of the automatic transmission or the disconnect mechanism such that a shift period based on the shift condition of the automatic transmission and an engagement-release period of the disconnect mechanism at least partially overlap with each other.

2. The control system according to claim 1, wherein the shift condition is one of a preset automatic shift condition that is prescribed based on a traveling state of the vehicle and a driver's operation related to a shift.

3. The control system according to claim 2, wherein the driver's operation related to the shift is in common with a predetermined operation related to engagement or release of the disconnect mechanism.

4. The control system according to claim 2, wherein the driver's operation related to the shift includes at least one of a change operation into a sequential shift that allows the driver to change a speed stage, a shift operation by the sequential shift, a change operation into a sport mode in which a shift point of the automatic transmission is changed to a power performance-oriented side, or a change operation into a first snow mode in which a shift into a predetermined speed stage is restricted, and
the electronic control unit is configured to:
 determine to engage the disconnect mechanism, when the operation related to the shift is carried out and the disconnect mechanism is released; and
 control at least one of the automatic transmission or the disconnect mechanism such that the shift period of the automatic transmission based on the operation related to the shift and the engagement period of the disconnect mechanism at least partially overlap with each other.

5. The control system claim 1, wherein
the electronic control unit is configured to:
 when any one of a change operation into an eco-mode in which an electronic throttle opening degree for an accelerator operation amount is changed to a fuel economy-oriented side, a cancellation operation of a second snow mode in which the electronic throttle opening degree for the accelerator operation amount is changed to a low opening degree side, a change operation to activate a cruise control system that controls the vehicle such that a predetermined traveling state is kept, a cancellation operation of a sport mode in which a shift point of the automatic transmission is changed to a power performance-oriented side, and a cancellation operation of a first snow mode in which a shift into a predetermined speed stage is restricted is carried out, determine to release the disconnect mechanism when the disconnect mechanism is engaged; and
 control at least one of the automatic transmission or the disconnect mechanism such that the shift period of the automatic transmission and the release period of the disconnect mechanism at least partially overlap with each other.

6. The control system according to claim 1, wherein
the electronic control unit is configured to:
 when any one of a cancellation operation of an eco-mode in which an electronic throttle opening degree for an accelerator operation amount is changed to a fuel economy-oriented side, a change operation into a second snow mode in which the electronic throttle opening degree for the accelerator operation amount is changed to a low opening degree side, and a cancellation operation of a cruise control system that controls the vehicle such that a predetermined traveling state is kept is carried out, determine to engage the disconnect mechanism when the disconnect mechanism is released; and
 control at least one of the automatic transmission or the disconnect mechanism such that the shift period of the automatic transmission and the engagement period of the disconnect mechanism at least partially overlap with each other.

7. The control system according to claim 1, further comprising:
a 4WD switch configured to change into one of the two-wheel drive mode and the four-wheel drive mode, wherein
the electronic control unit is configured to:
 determine to engage the disconnect mechanism when the 4WD switch is operated to change to a four-wheel drive mode side while the vehicle is traveling in a state where the disconnect mechanism is released; and
 control at least one of the automatic transmission or the disconnect mechanism such that the shift period based on the automatic shift condition and the engagement period of the disconnect mechanism at least partially overlap with each other when an automatic shift condition that is prescribed based on a traveling state of the vehicle is satisfied after the 4WD switch is operated to change to the four-wheel drive mode side.

8. The control system according to claim 1, further comprising:
a 4WD switch configured to change into one of the two-wheel drive mode and the four-wheel drive mode, wherein the electronic control unit is configured to:
- determine to release the disconnect mechanism when the 4WD switch is operated to change to a two-wheel drive mode side while the vehicle is traveling in a state where the disconnect mechanism is engaged; and
- control at least one of the automatic transmission or the disconnect mechanism such that the shift period of the automatic transmission based on the automatic shift condition and the release period of the disconnect mechanism at least partially overlap with each other when an automatic shift condition that is prescribed based on a traveling state of the vehicle is satisfied after the 4WD switch is operated to change to the two-wheel drive mode side.

9. The control system according to claim 1, wherein the electronic control unit is configured to start engagement or release of the disconnect mechanism when the electronic control unit determines that a predetermined time elapses or a substantial start of shift is detected, after the electronic control unit determines to shift the automatic transmission or outputs a command to shift the automatic transmission.

10. The control system according to claim 1, wherein the electronic control unit is configured to delay output of a command to shift the automatic transmission with respect to a command to engage or release the disconnect mechanism.

11. The control system according to claim 1, wherein the electronic control unit is configured to, when a predetermined condition for engaging or releasing the disconnect mechanism is satisfied, start engagement or release of the disconnect mechanism without waiting for a command to shift the automatic transmission.

12. The control system according to claim 11, wherein the predetermined condition is a case where the electronic control unit determines that there is a slip of the vehicle based on the fact that a rotational speed difference between the main drive wheels and the auxiliary drive wheels exceeds a predetermined value or a case where the electronic control unit determines that the vehicle is in a steady traveling state based on a vehicle speed, accelerator operation amount, steering angle, of the vehicle and a predetermined time set in advance has elapsed in the steady traveling state.

* * * * *